United States Patent
Chen et al.

(10) Patent No.: US 12,499,572 B2
(45) Date of Patent: Dec. 16, 2025

(54) IMAGE PROCESSING METHOD AND ELECTRONIC DEVICE

(71) Applicant: HUAWEI TECHNOLOGIES CO., LTD., Guangdong (CN)

(72) Inventors: Shaojun Chen, Shanghai (CN); Zhiming Pi, Shanghai (CN); Jiong Ding, Shanghai (CN); Yun Lin, Shenzhen (CN); Zhangliang Xiong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 18/267,260

(22) PCT Filed: Dec. 2, 2021

(86) PCT No.: PCT/CN2021/135041
§ 371 (c)(1),
(2) Date: Jun. 14, 2023

(87) PCT Pub. No.: WO2022/127609
PCT Pub. Date: Jun. 23, 2022

(65) Prior Publication Data
US 2024/0046504 A1    Feb. 8, 2024

(30) Foreign Application Priority Data
Dec. 15, 2020 (CN) .................. 202011483124.1

(51) Int. Cl.
| | | |
|---|---|---|
| *G06T 5/77* | (2024.01) | |
| *G06T 7/12* | (2017.01) | |
| *G06T 7/70* | (2017.01) | |
| *G06V 10/74* | (2022.01) | |

(52) U.S. Cl.
CPC .................. *G06T 7/70* (2017.01); *G06T 7/12* (2017.01); *G06V 10/761* (2022.01); *G06T 2207/30242* (2013.01)

(58) Field of Classification Search
CPC ... G06T 7/70; G06T 7/12; G06T 2207/30242; G06T 2207/10016; G06T 2207/20221;
(Continued)

(56) References Cited

U.S. PATENT DOCUMENTS

| | | | |
|---|---|---|---|
| 2014/0184858 A1 | 7/2014 | Yu et al. | |
| 2016/0225127 A1* | 8/2016 | Lu ........................ | G06V 10/751 |

FOREIGN PATENT DOCUMENTS

| | | |
|---|---|---|
| CN | 101266685 A | 9/2008 |
| CN | 103092946 A | 5/2013 |

(Continued)

OTHER PUBLICATIONS

Mwen Luo and Xiaoou Tang:"Photo and Video Quality Evaluation: Focusing on the Subject." Oct. 12, 2008, total 14 pages.
(Continued)

*Primary Examiner* — Edward Park
*Assistant Examiner* — Alexander Joseph Vaughn
(74) *Attorney, Agent, or Firm* — WOMBLE BOND DICKINSON (US) LLP

(57) ABSTRACT

Embodiments of this application provide an image processing method. The method includes: A plurality of images that meet a first condition are determined, where the first condition includes that a similarity between any two images in the plurality of images is greater than or equal to a first threshold. A first image that meets a second condition is determined from the plurality of images, where the first image includes a first object, and the first object is a to-be-eliminated object in the first image. A second image is determined from the plurality of images, where the second (Continued)

image includes a second object, and a position of the second object in the second image corresponds to a position of the first object in the first image. The first object is covered by or replaced with the second object, to obtain a target image.

20 Claims, 27 Drawing Sheets

(58) Field of Classification Search
CPC ... G06T 2207/30196; G06T 5/50; G06T 5/77; G06T 3/04; G06V 10/761; G06V 20/70; G06V 10/764; G06F 18/24
See application file for complete search history.

(56) References Cited

FOREIGN PATENT DOCUMENTS

| CN | 105933604 A | | 9/2016 | |
| --- | --- | --- | --- | --- |
| CN | 107343149 A | * | 11/2017 | ............. H04N 23/80 |
| CN | 109377502 A | | 2/2019 | |
| CN | 111556278 A | | 8/2020 | |

OTHER PUBLICATIONS

Mwen Luo and Xiaoou Tang:"Photo and Video Quality Evaluation: Focusing on the Subject." Oct. 12, 2008, total 14 pages. XP019109271.

* cited by examiner

IMAGE PROCESSING METHOD AND ELECTRONIC DEVICE

This application is a National Stage of International Application No. PCT/CN2021/135041, filed on Dec. 2, 2021, which claims priority to Chinese Patent Application No. 202011483124.1, filed on Dec. 15, 2020, both of which are hereby incorporated by reference in their entireties.

TECHNICAL FIELD

This application relates to the field of image processing technologies, and in particular, to an image processing method and an electronic device.

BACKGROUND

When a user takes a photo with an electronic device such as a mobile phone or a tablet computer, a moving object such as a passerby or a vehicle that passes through a photographing region is usually captured. However, the user does not want to retain the moving object in the photo in most cases. To meet a user requirement, the electronic device may provide a function of eliminating the moving object in the photo.

Currently, the user may enable a photographing mode of the electronic device and capture a plurality of frames of images (for example, a 1.7-second video) in the photographing mode. Based on the plurality of frames of images, the electronic device may eliminate a passerby and fill a region where the passerby is eliminated. However, such a manner is not convenient, and the electronic device cannot process a single photo captured by the user in a default photographing mode of the electronic device. In some embodiments, after capturing a single photo in the default photographing mode of the electronic device, the user may select and eliminate a person in the single photo. Image content used to fill a region where the person is eliminated is guessed by the electronic device by using a technology such as artificial intelligence (AI). The guessed image content is likely to greatly differ from a surrounding environment and has low authenticity.

SUMMARY

Embodiments of this application disclose an image processing method and an electronic device, to eliminate a moving object on an image in a common scenario. This is convenient for a user to use, and an image on which the moving object is eliminated has high authenticity.

According to a first aspect, embodiments of this application provide an image processing method. The method is applied to an electronic device and includes: a plurality of images that meet a first condition are determined, where the first condition includes that a similarity between any two images in the plurality of images is greater than or equal to a first threshold, and the plurality of images include at least two images. A first image that meets a second condition is determined from the plurality of images, where the first image includes a first object, and the first object is a to-be-eliminated object in the first image. A second image is determined from the plurality of images, where the second image includes a second object, and a position of the second object in the second image corresponds to a position of the first object in the first image. The first object is covered by or replaced with the second object, to obtain a target image.

In embodiments of this application, the electronic device may eliminate the first object based on the plurality of images, and a similarity between any two images in the plurality of images is high. Any one of the plurality of images may be captured in a default photographing mode of the electronic device and is not necessarily captured in a specific photographing mode. This is more convenient for the user to use and has a wide range of application scenarios. In addition, the second object used to cover or replace the first object is obtained based on a real second image. Therefore, consistency between the target image and the real world is higher, and a display effect is better, thereby improving user experience.

In a possible embodiment, the first condition further includes at least one of the following: a photographing time of any one of the plurality of images is within a first range, and a photographing location of any one of the plurality of images is within a second range.

In embodiments of this application, the electronic device may not only determine, based on the similarity between the images, the plurality of images used to eliminate the first object, but also determine the plurality of images based on the photographing time and/or the photographing location of the images, to further ensure that the plurality of images obtained belong to a same photographing scenario. Eliminating the first object based on the plurality of images may improve authenticity of the target image, and user experience is better.

In a possible embodiment, before the plurality of images that meet the first condition are determined, the method further includes: A first operation is received, where the first operation is used to select the plurality of images.

In embodiments of this application, the user can select a plurality of images for eliminating the first object, the embodiment is flexible, the obtained target image also better meets a user requirement, and user experience is better.

In a possible embodiment, the second condition includes at least one of the following: a definition of a photographed subject in the first image is greater than or equal to a second threshold, a quantity of other objects than the photographed subject in the first image is less than a third threshold, and a second operation is received, where the second operation is used to select the first image.

In embodiments of this application, the first image for obtaining the target image may meet the second condition. For example, the photographed subject has a high definition, and there are a small quantity of objects other than the photographed subject. Therefore, the photographed subject in the obtained target image also has a better display effect, and user experience is better.

In a possible embodiment, the second image is an image other than the first image in the plurality of images, and a similarity between the second image and the first image is greater than or equal to a fourth threshold.

In embodiments of this application, the second image may be an image that is in the plurality of images and that is more similar to the first image. When the electronic device covers or replaces the first object in the first image with the second object in the second image, the obtained target image has a better display effect, and user experience is better.

In a possible embodiment, the method further includes: The photographed subject that meets a third condition is determined from the plurality of images, where the third condition includes at least one of the following: a definition of the photographed subject in any one of the plurality of images is greater than or equal to a fifth threshold, a focus point of any one of the plurality of images is located in a region of the photographed subject, an area of the photographed subject in any one of the plurality of images is greater than or equal to a sixth threshold, the photographed subject belongs to a preset category, and a third operation is received, where the third operation is used to select the photographed subject.

In embodiments of this application, the electronic device determines the photographed subject in various manners, and the electronic device may determine, based on a capability of the electronic device, a manner of determining a photographed subject, so that application scenarios are of a wide range. For example, when a processing capability is relatively strong, the electronic device may determine a photographed subject in a plurality of manners, so that the determined photographed subject better meets a user requirement.

In a possible embodiment, the method further includes: a fourth operation is received, where the fourth operation is used to select the first object.

In embodiments of this application, the user can select a to-be-eliminated object, the embodiment is relatively flexible, the obtained target image also better meets a user requirement, and user experience is better.

In a possible embodiment, the method further includes: A central point of a third object in the first image, a central point of a fourth object in the first image, a central point of a fifth object in a third image, and a central point of a sixth object in the third image are determined, where the third image is any image other than the first image in the plurality of images, the third object and the fifth object have a same attribute, and the fourth object and the sixth object have a same attribute. The central point of the third object and the central point of the fifth object are set with a same coordinate origin, and a first coordinate system is established based on the coordinate origin. A first distance between the central point of the fourth object and the central point of the sixth object is determined based on the first coordinate system. The fourth object is determined as the first object when the first distance is greater than or equal to a seventh threshold.

In embodiments of this application, before determining the first object, the electronic device may first place two to-be-determined images in a same first coordinate system, to exclude an impact of factors such as displacement and rotation, so that the obtained target image has a better display effect, and user experience is better.

In a possible embodiment, objects represented by the third object and the fifth object are at a same location at any time point.

In embodiments of this application, the third object and the fifth object for determining the first coordinate system may be a same fixed object (for example, a building, a tree, or a flower), so that the obtained first coordinate system is consistent with the world coordinate system as much as possible, the obtained target image is more consistent with the real world, and the display effect is better.

In a possible embodiment, the method further includes: a fifth operation is received, and a first interface is displayed in response to the fifth operation, where the plurality of images and the target image are displayed in the first interface.

In embodiments of this application, the electronic device can eliminate the first object without being sensed by the user and recommend the obtained target image to the user for viewing, so that there is no need for the user to manually trigger an elimination function, thereby being more convenient in use.

According to a second aspect, embodiments of this application provide an electronic device. The electronic device includes at least one memory and at least one processor, the at least one memory is coupled to the at least one processor, the at least one memory is configured to store a computer program, the at least one processor is configured to invoke the computer program, the computer program includes instructions, and when the instructions are executed by the at least one processor, the electronic device is enabled to perform the image processing method according to the first aspect or any embodiment of the first aspect in embodiments of this application.

According to a third aspect, embodiments of this application provide a computer storage medium, including computer instructions. When the computer instructions are run on an electronic device, the electronic device is enabled to perform the image processing method according to the first aspect or any embodiment of the first aspect in embodiments of this application.

According to a fourth aspect, embodiments of this application provide a computer program product. When the computer program product is run on an electronic device, the electronic device is enabled to perform the image processing method according to the first aspect or any embodiment of the first aspect in embodiments of this application.

According to a fifth aspect, embodiments of this application provide a chip. The chip includes at least one processor, an interface circuit, and a memory. The memory, the interface circuit, and the at least one processor are interconnected through a line. The memory stores a computer program. When the computer program is executed by the at least one processor, the image processing method according to the first aspect or any embodiment of the first aspect in embodiments of this application is implemented.

It may be understood that the electronic device provided in the second aspect, the computer storage medium provided in the third aspect, the computer program product provided in the fourth aspect, and the chip provided in the fifth aspect are all configured to perform the image processing method according to the first aspect or any embodiment of the first aspect. Therefore, for beneficial effects that can be achieved, refer to beneficial effects of the image processing method according to the first aspect. Details are not described herein again.

BRIEF DESCRIPTION OF DRAWINGS

The following describes the accompanying drawings used in embodiments of this application.

FIG. 12, FIG. 13A and FIG. 13B, and FIG. 14(A) and FIG. 14(B) to FIG. 18 are schematic diagrams of some other examples of user interfaces according to an embodiment of this application.

DESCRIPTION OF EMBODIMENTS

Figure 1:
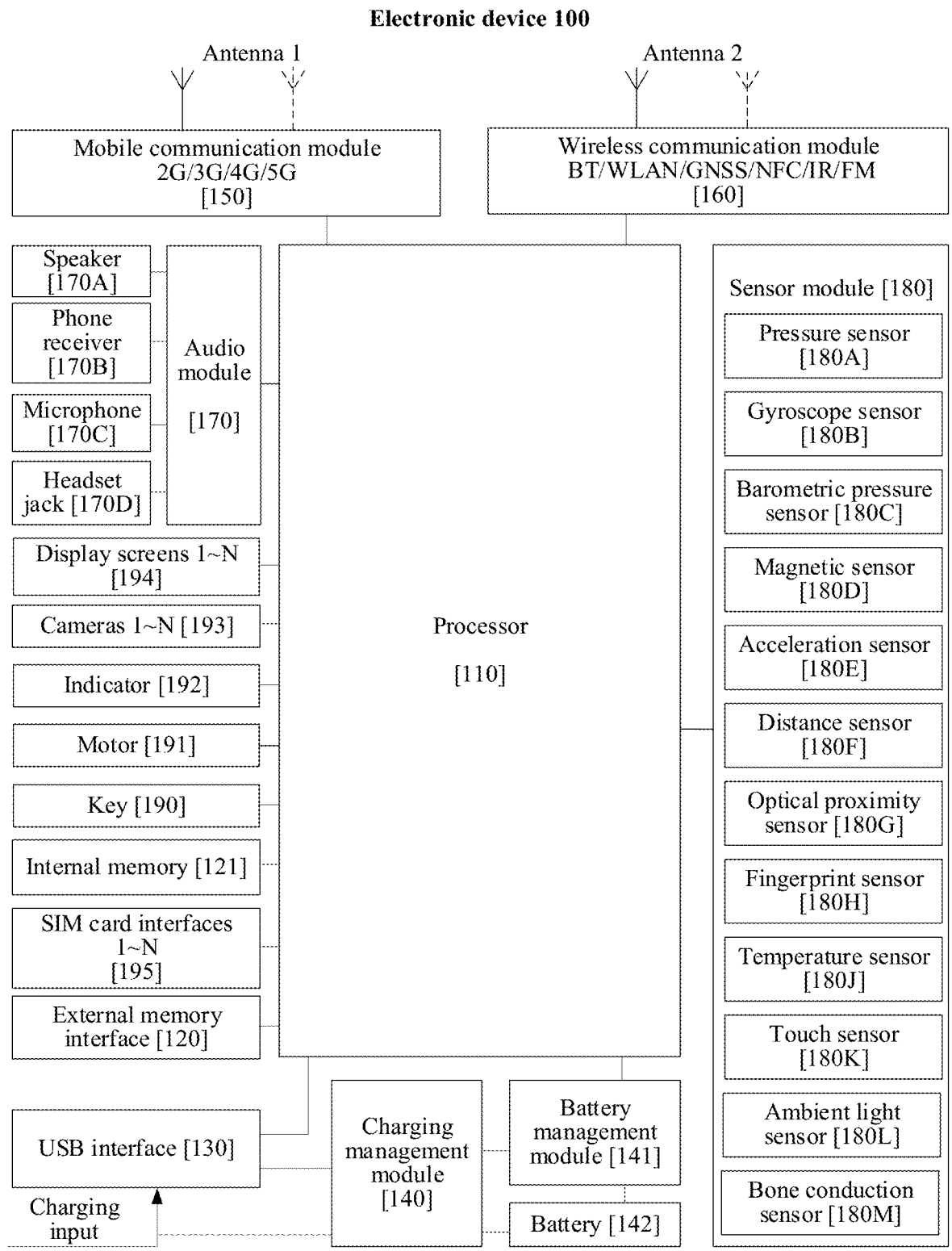
FIG. 1 is a schematic diagram of a hardware structure of an electronic device according to an embodiment of this application.

Terms used in the following embodiments of this application are merely intended to describe example embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that a term "and/or" used in this application indicates and includes any one or all of possible combinations of one or more listed items.

This application provides an image processing method, applicable to an electronic device. The electronic device may group a plurality of images based on a similarity between any two images, to obtain at least one to-be-processed image group. Any one to-be-processed image group may include one first image and at least one second image. The electronic device may eliminate a first object in the first image based on one to-be-processed image group. In other words, a second object is first obtained based on the at least one second image, and then the first object in the first image is covered by or replaced with the second object. The plurality of images may be captured in a default photographing mode of the electronic device and are not necessarily obtained in a specific photographing mode, so that application scenarios are relatively wide, and use is more convenient for a user. In addition, the second object is authentic and reliable image content obtained based on the at least one second image, so that a display effect is better, thereby improving user experience.

It may be understood that, when capturing an image by using the electronic device, the user usually wants to retain one or more real objects in the image, and the one or more real objects may be referred to as photographed subjects. Any image in a target image group may include a photographed subject, for example, a person, a mountain, a tree, water, a sky, or an animal. However, when the user captures an image with the electronic device, another real object (that is, the first object) other than the photographed subject often passes through a photographing region. As a result, the first object exists in the captured image, for example, a passerby exists in the first image, and a passerby and a passing vehicle exist in a plurality of second images. The user usually does not want to retain the first object in the captured image. Therefore, the first object may also be understood as a to-be-eliminated object. The first object passes through the photographing region. Therefore, the first object may also be understood as a moving object relative to the photographed subject (referred to as a moving object for short).

The electronic device involved in embodiments of this application may be a device such as a smart screen, a smart television, a mobile phone, a tablet computer, a desktop computer, a laptop computer, a notebook computer, an ultra-mobile personal computer (UMPC), a handheld computer, a netbook, a personal digital assistant (PDA), or a wearable electronic device (such as a smart band or smart glasses).

The following describes an exemplary electronic device provided in embodiments of this application.

Refer to FIG. 1. FIG. 1 is a schematic diagram of a structure of an electronic device 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural network processing unit (NPU), and/or the like. Different processing units may be independent components, or may be integrated into one or more processors.

The controller may generate an operation control signal based on an instruction operation code and a time sequence signal, to complete control of instruction reading and instruction execution.

A memory may be further arranged in the processor 110, and is configured to store instructions and data. In some embodiments, the memory in the processor 110 is a cache memory. The memory may store an instruction or data that has been used or cyclically used by the processor 110. If the processor 110 is to use the instructions or the data again, the processor may directly invoke the instructions or the data from the memory. This avoids repeated access, reduces waiting time of the processor 110, and improves system efficiency.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be arranged in the processor 110. In some embodiments, at least some functional modules of the mobile communication module 150 may be arranged in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is arranged in a same device as the mobile communication module 150 or another functional module.

The wireless communication module 160 may provide a wireless communication solution that is applied to the electronic device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be arranged in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

In some embodiments, the electronic device 100 may be configured with a plurality of cameras 193, and the plurality of cameras 193 may include a front-facing camera and a rear-facing camera. In some embodiments, there may be a plurality of front-facing cameras. The front-facing camera may be arranged, for example, on a top of a front surface of the electronic device 100. In some embodiments, there may be a plurality of rear-facing cameras, for example, rear-facing wide-angle cameras, rear-facing ultra-wide-angle cameras, or rear-facing telephoto cameras. The rear-facing camera may be arranged, for example, on a back surface of the electronic device 100. In some embodiments of this application, the plurality of cameras 193 may, in some embodiments, be lifting type cameras, detachable cameras, or the like. A connection manner and a mechanical mechanism for the plurality of cameras 193 and the electronic device 100 are not limited in embodiments of this application.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (UFS). The processor 110 runs instructions stored in the internal memory 121 and/or instructions stored in the memory arranged in the processor, to perform various function applications and data processing of the electronic device 100.

In embodiments of this application, the electronic device 100 may obtain and store a plurality of images by using the camera 193. The plurality of images may be stored in the internal memory 121 or in an external memory card connected to the external memory interface 120. Then, the processor 110 of the electronic device 100 may group the plurality of images based on similarities, to obtain at least one to-be-processed image group. A similarity between two images is represented by, for example, but not limited to, a difference between photographing times, a distance difference between photographing locations, or a distance or angle between image feature vectors. The processor 110 may identify and eliminate a moving object based on the obtained to-be-processed image group, for example, cover a region where the moving object is located by using a real image. The real image may be obtained based on at least one image in the to-be-processed image group.

The pressure sensor 180A is configured to sense a pressure signal, and can convert the pressure signal into an electrical signal. In some embodiments, the pressure sensor 180A may be arranged on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The touch sensor 180K is also referred to as a "touch component". The touch sensor 180K may be arranged on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be arranged on a surface of the electronic device 100 at a location different from that of the display 194.

The key 190 includes a power button, a volume button, and the like. The key 190 may be a mechanical button, or may be a touch button. The electronic device 100 may receive a key input, and generate a key signal input related to user setting and function control of the electronic device 100.

A software system of the electronic device 100 may use a layered architecture, an event-driven architecture, a microkernel architecture, a micro service architecture, or a cloud architecture. In an embodiment of this application, an Android system with a layered architecture is used as an example to describe a software structure of the electronic device 100.

Figure 2:
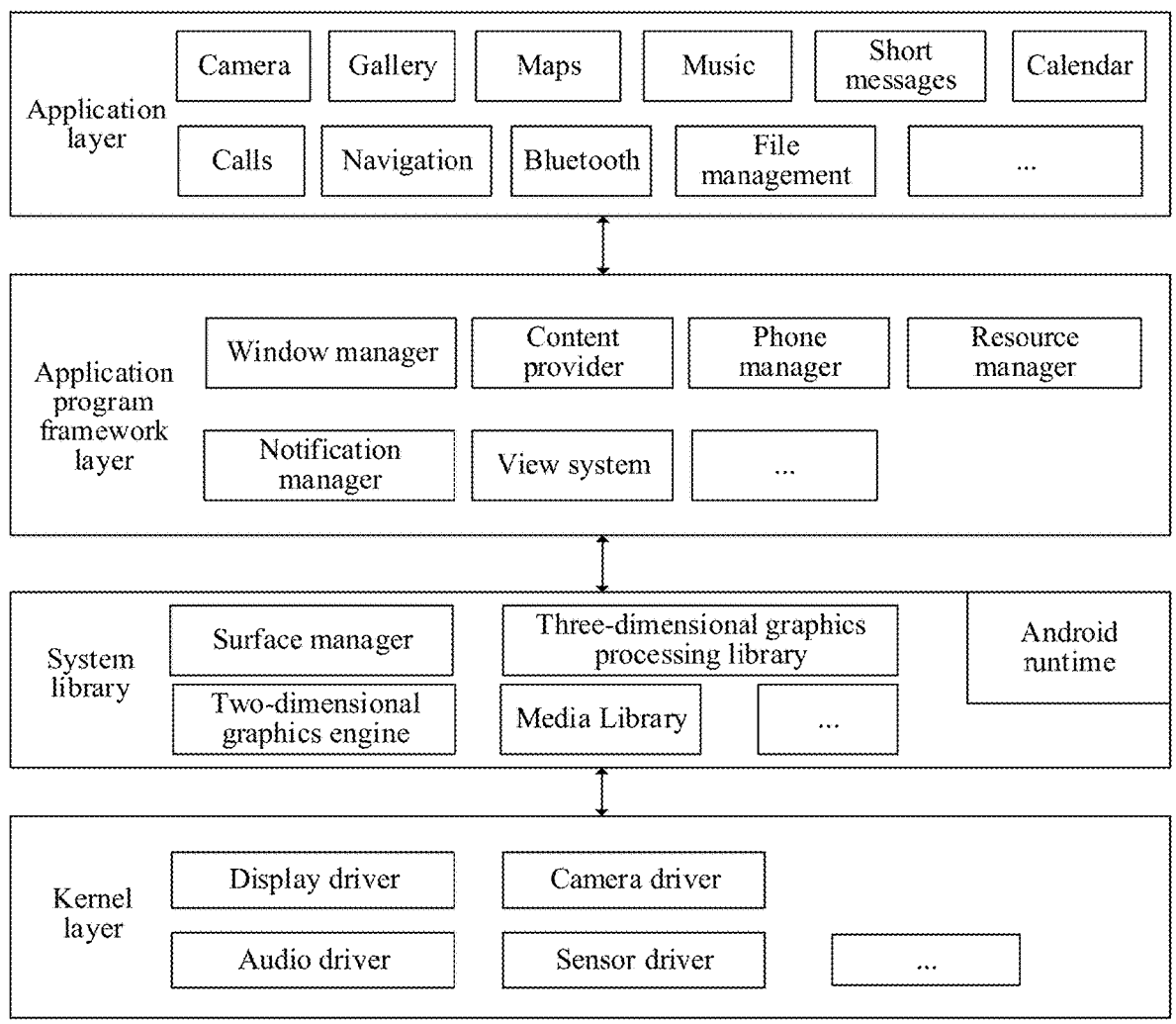
FIG. 2 is a schematic diagram of a software architecture of another electronic device according to an embodiment of this application.

FIG. 2 is a block diagram of a software structure of the electronic device 100 according to an embodiment of this application.

In a layered architecture, software is divided into several layers, and each layer has a clear role and task. The layers communicate with each other through a software interface. In some embodiments, an Android® system is divided into four layers, namely, an application layer, an application framework layer, an Android runtime and system library, and a kernel layer from top to bottom. In this application, a software framework shown in FIG. 2 is merely an example. The system of the electronic device 100 may, in some embodiments, be another operating system, such as IOS®, Windows®, or Huawei Mobile Services (HMS).

The application layer may include a series of applications.

As shown in FIG. 2, the application may include Camera, Gallery, Maps, Music, Short messages, Calendar, Calls, Navigation, Bluetooth, File management, and the like.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may, in some embodiments, be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that is to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It may be understood that, an application such as Camera or Gallery may include a moving object elimination function, and the user may use the moving object elimination function through the application such as Camera or Gallery, to obtain an image in which a moving object is eliminated. This application is not limited thereto. Moving object elimination may, in some embodiments, be an application installed on the electronic device 100 or an online application, for example, a web application or an applet application. This is not limited in embodiments of this application.

For ease of description, the following embodiments are described by using an example in which the moving object elimination is a function included in a gallery application.

The following describes examples of working processes of software and hardware of the electronic device 100 with reference to a shooting scenario.

When the pressure sensor 180A and/or the touch sensor 180K receive/receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. Using an example in which the touch operation is a touch tap operation, and a control corresponding to the tap operation is a shooting control of a camera application, the camera application invokes an interface of the application framework layer, and then invokes the kernel layer to start the camera driver, and takes one or more photos by using the camera 193. The one or more photos may be saved as a plurality of pictures (which is also referred to as images) in a gallery (which is also referred to as an album).

Figure 3:
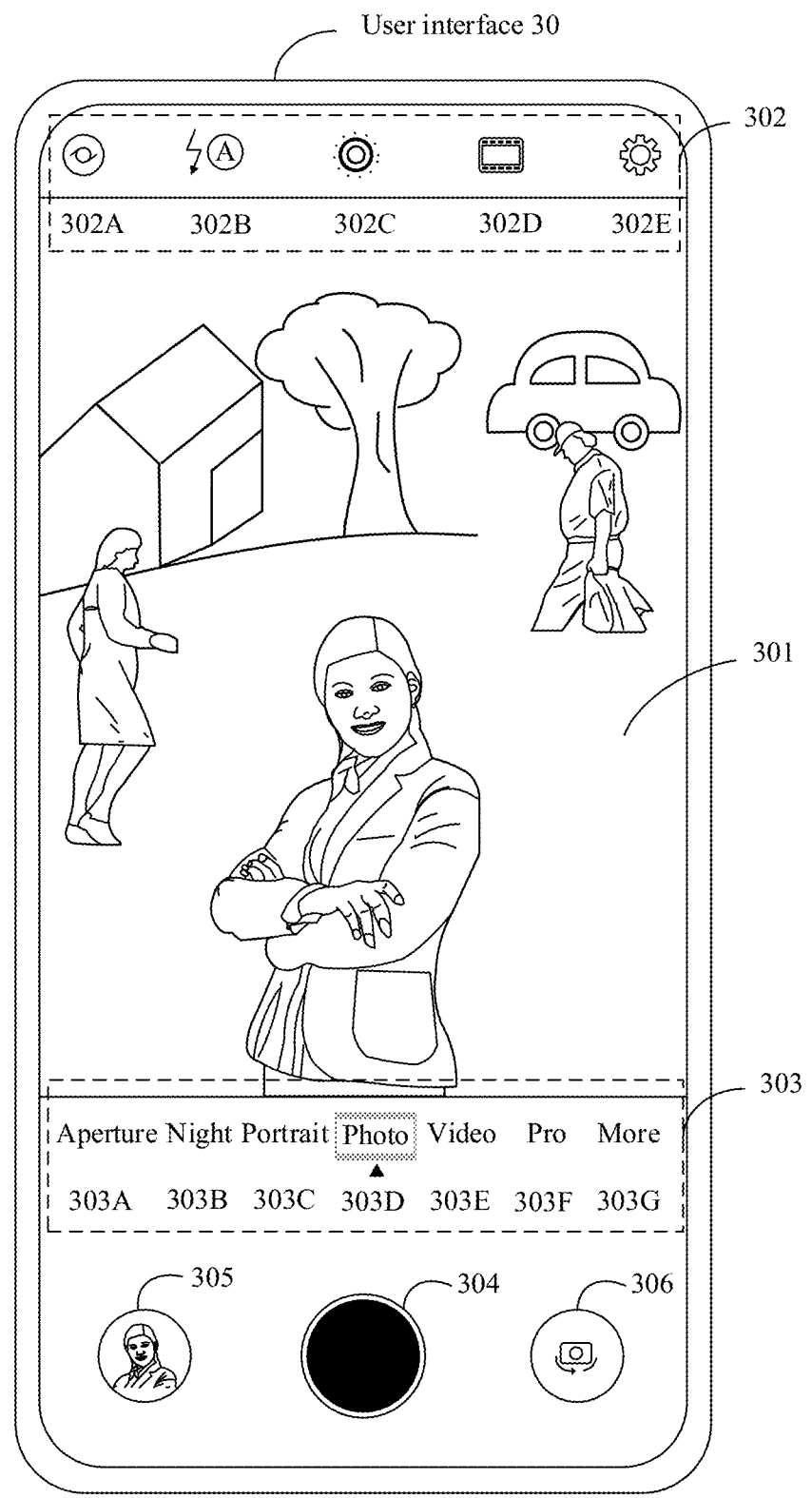
FIG. 3 is a schematic diagram of an example of a user interface according to an embodiment of this application.

Refer to FIG. 3. FIG. 3 shows an example of a user interface 30 of a camera application on an electronic device such as a smartphone (where the electronic device may correspond to the foregoing electronic device 100). The electronic device may detect a touch operation (for example, a tap operation) performed on an icon of the camera application. The icon of the camera application may be on a desktop of the electronic device, and the desktop of the electronic device may include icons of a plurality of applications. The electronic device may display the user interface 30 in FIG. 3 in response to the touch operation. The user interface 30 may be a user interface of a default shooting mode of the camera application, and may be used by the user to take a photo by using a default rear-facing camera of the electronic device. In other words, the user may tap the icon of the camera application to open the user interface 30 of the camera application. This application is not limited thereto. The user may, in some embodiments, open the user interface 30 in another application. For example, the user taps a photographing control in a social application to open the user interface 30.

As shown in FIG. 3, the user interface 30 may include a region 301, a photographing function list 302, a photographing mode list 303, a control 304, a control 305, and a control 306.

The region 301 may be referred to as a preview frame 301 or a viewfinder frame 301. The preview frame 301 may be configured to display an image acquired by the camera 193 in real time, and the electronic device may refresh displayed content in the image in real time, so that the user can preview an image currently acquired by the camera 193.

At least one photographing function option may be displayed in the photographing function list 302, namely, a smart vision option 302A, a flash option 302B, a dynamic photo option 302C, a color mode option 302D, and a camera setting option 302E.

For example, the electronic device may detect a user operation (for example, a tap operation) performed by the user on the dynamic photo option 302C, to enable or disable a function of taking a dynamic photo. When the function of taking a dynamic photo is enabled, the electronic device may detect a user operation of triggering shooting. The electronic device may capture a plurality of frames of images in response to the user operation, and encode the plurality of frames of images into a video. The video is a dynamic photo. For example, the electronic device may capture 40 frames of images, and encode the 40 frames of images into a video (that is, a dynamic photo) of 24 frames per second (fps). Duration of the video is 1.7 seconds.

At least one photographing mode option may be displayed in the photographing mode list 303, namely, an aperture mode option 303A, a night mode option 303B, a portrait mode option 303C, a shooting mode option 303D, a video recording mode option 303E, a professional mode option 303F, and a more mode option 303G. In FIG. 3, the shooting mode option 303D is in a selected state, and is used to indicate that a current photographing mode of the electronic device is a shooting mode. The shooting mode may be a default photographing mode of the electronic device. The electronic device may detect a user operation (for example, a tap operation) performed on another photographing mode option in the photographing mode list 303, and the electronic device may switch a photographing mode in response to the user operation.

The control 304 may be configured to listen to a user operation of triggering photographing (shooting or video recording). The electronic device may detect a user operation (for example, a tap operation) performed on the control 304, and the electronic device may store an image in the preview frame 301 as a picture or a video in the gallery application in response to the operation. In other words, the user may tap the control 304 to trigger photographing. The gallery application may support the user in performing various operations on a picture or a video stored in the electronic device, for example, operations such as browsing, editing, deleting, and selecting. In addition, the electronic device may further display a thumbnail of the stored image in the control 305.

The control 306 may be configured to listen to a user operation of triggering flipping of the camera. The electronic device may detect a user operation (for example, a tap operation) performed on the control 306, and the electronic device may switch, in response to the operation, a camera configured to acquire an image, for example, switch the camera configured to acquire an image from a rear-facing camera to a front-facing camera.

In this application, the electronic device may capture a plurality of pictures (which may also be referred to as images) by using the camera 193 and store the plurality of pictures. The electronic device may group the plurality of images based on a similarity between any two images, to obtain at least one to-be-processed image group (which is referred to as a first group for short). The at least one first group is used by the electronic device to eliminate a moving object. The electronic device may correspond to the foregoing electronic device 100.

When performing grouping, the electronic device may first perform image feature extraction on each image. The electronic device may perform image feature extraction by using a conventional computer vision (CV) algorithm, for example, perform corner detection and feature expression by using algorithms such as scale-invariant feature transform (SIFT) and speeded up robust features (SURF). In some embodiments, the electronic device may perform image feature extraction by using a deep learning (DL) algorithm such as a convolutional neural network (CNN). After extracting feature vectors of images, the electronic device may calculate a parameter such as a distance or included angle between feature vectors of any two images, and determine a similarity between the two images based on the parameter. When the similarity is greater than or equal to a first threshold, the electronic device determines that the two images meet a similarity condition.

For example, the electronic device may calculate a Euclidean distance between feature vectors of any two images. A shorter Euclidean distance indicates a higher similarity between the two images, and a longer Euclidean distance indicates a lower similarity between the two images. In some embodiments, the electronic device may calculate a cosine distance between feature vectors of any two images. A shorter cosine distance indicates a higher similarity between the two images, and a longer cosine distance indicates a lower similarity between the two images.

In some embodiments, before calculating the similarity, the electronic device may process, based on photographing times, the plurality of images stored in the electronic device, to obtain a second group that meets a preset time condition. Then, the electronic device determines a similarity based on the second group. The preset time condition includes that a photographing time of any image in the second group is within a first range, or a difference between photographing times of any two images in the second group is less than or equal to a first time threshold. For example, the gallery application includes 10 images that are not grouped. The 10 images are photographed on a same day, and photographing times are respectively 9:10, 9:11, 9:11, 9:15, 10:10, 10:15, 11:21, 14:35, 14:35, and 14:36. The electronic device groups the 10 images based on the photographing times. The first time threshold is 5 minutes. Therefore, four images whose photographing times are respectively 9:10, 9:11, 9:11, and 9:15 belong to a group 1, two images whose photographing times are respectively 10:10 and 10:15 belong to a group 2, one image whose photographing time is 11:21 belongs to a group 3, and three images whose photographing times are respectively 14:35, 14:35, and 14:36 belong to a group 4. In other words, the electronic device obtains four second groups, namely, the group 1, the group 2, the group 3, and the group 4.

Figure 4:
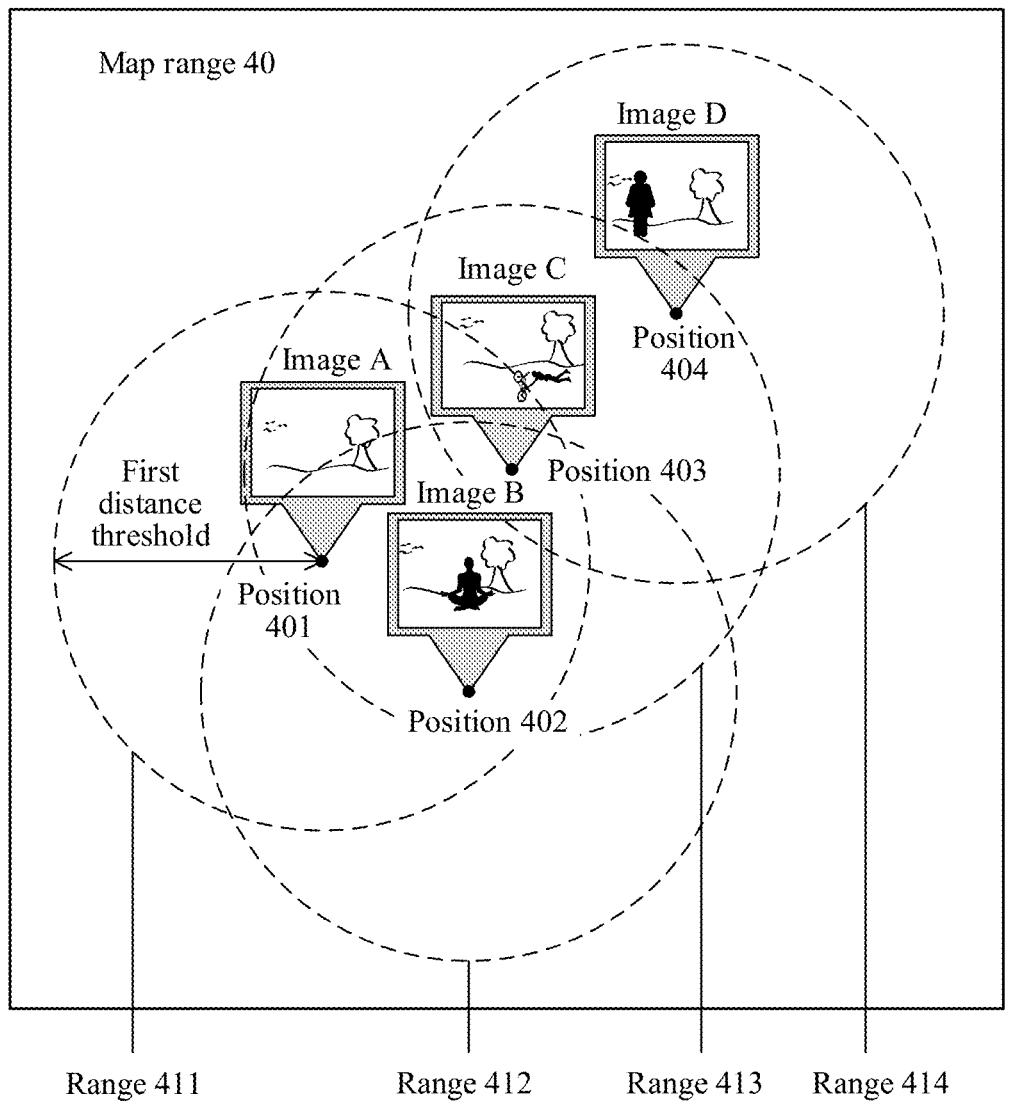
FIG. 4 is a schematic diagram of a grouping manner according to an embodiment of this application.

In some embodiments, before calculating the similarity, the electronic device may process, based on photographing locations, the plurality of images stored in the electronic device, to obtain a third group that meets a preset location condition. An example is shown in FIG. 4. Then, the electronic device determines a similarity based on the third group. The preset location condition includes that a photographing location of any image in the second group is within a second range, or a distance difference between photographing locations of any two images in the second group is less than or equal to a first distance threshold. In this application, a photographing location of any image may be obtained by the electronic device by using a technology such as GPS, and the photographing location may be represented by a longitude and a latitude. For example, when the photographing location is the Wuhan municipal government, the longitude is 114.305215, the latitude is 0.592935, and the photographing location may be represented as (114.305215, 30.592935).

Refer to FIG. 4. FIG. 4 shows an example of a map range 40 obtained by an electronic device by using a technology such as GPS. There are four positions in the map range 40, namely, a position 401, a position 402, a position 403, and a position 404. The position 401 is a photographing location of an image A, the position 402 is a photographing location of an image B, the position 403 is a photographing location of an image C, and the position 404 is a photographing location of an image D. The image A, the image B, the image C, and the image D are a plurality of images stored in the electronic device. It should be noted that any one of the image A, the image B, the image C, and the image D may include one or more images.

As shown in FIG. 4, a circle with the position 401 as a center of a circle and the first distance threshold as a radius is a range 411. In other words, a distance difference between any position in the range 411 and the position 401 is less than or equal to the first distance threshold. Similarly, a circle with the position 402 as a center of a circle and the first distance threshold as a radius is a range 412. In other words, a distance difference between any position in the range 412 and the position 402 is less than or equal to the first distance threshold. A circle with the position 403 as a center of a circle and the first distance threshold as a radius is a range 413. In other words, a distance difference between any position in the range 413 and the position 403 is less than or equal to the first distance threshold. A circle with the position 404 as a center of a circle and the first distance threshold as a radius is a range 414. In other words, a distance difference between any position in the range 414 and the position 404 is less than or equal to the first distance threshold.

Therefore, as can be learned from FIG. 4, a distance difference between the position 401 and the position 402 and a distance difference between the position 401 and the position 403 are less than the first distance threshold, a distance difference between the position 402 and the position 403 is less than the first distance threshold, and a distance difference between the position 403 and the position 404 is less than the first distance threshold. In this case, the electronic device may group the image A, the image B, and the image C into a third group, and group the image C and the image D into another third group.

This application is not limited to the foregoing enumerated cases. In some embodiments, the electronic device may also measure a similarity between two images based on photographing times and/or photographing locations. In other words, a smaller difference between the photographing times indicates a higher similarity, and a larger difference between the photographing times indicates a lower similarity. Similarly, a smaller distance difference between the photographing locations indicates a higher similarity, and a larger distance difference between the photographing locations indicates a lower similarity. In some embodiments, the electronic device may first process, based on photographing times and photographing locations, images stored in the electronic device, to obtain a fourth group that meets the preset time condition and the preset location condition. Then, the electronic device determines a similarity based on the fourth group, to obtain at least one first group. A specific manner of obtaining the first group is not limited in this application.

In some embodiments, the electronic device may first perform focal length registration on a plurality of stored images, that is, set a focal length of each image to a same focal length. Then, the electronic device performs grouping based on the plurality of images on which focal length registration is performed, to obtain at least one first group, thereby reducing a processing error. This application is not limited thereto. The electronic device may first perform angle registration on the plurality of stored images, for example, control an angle between photographed subjects in any two images to be less than or equal to 5 degrees, and then perform grouping based on the plurality of images on which angle registration is performed.

Figure 5:
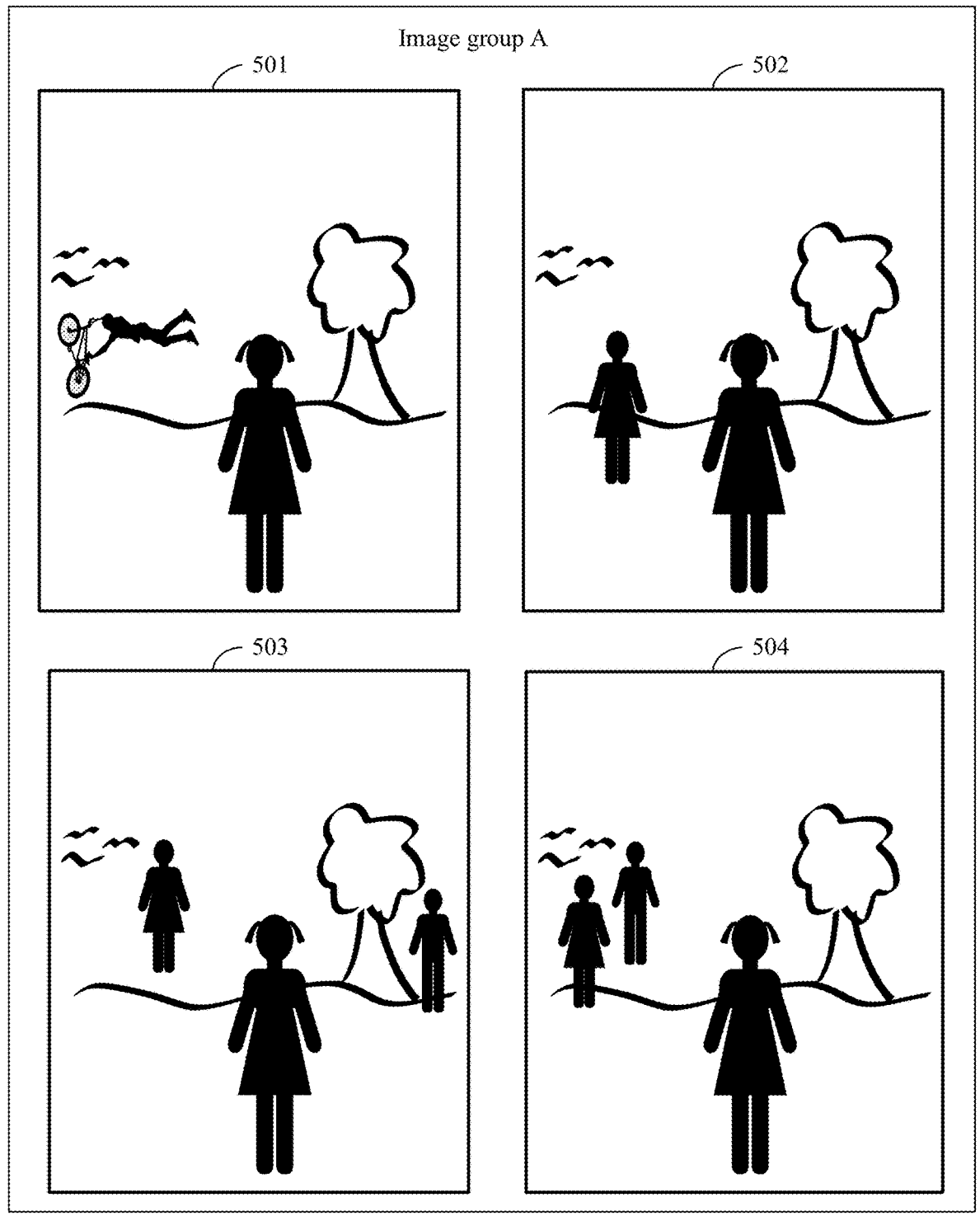
FIG. 5 and FIG. 6 are image groups obtained in some grouping processes according to an embodiment of this application.

It may be understood that the electronic device may process, based on the foregoing grouping process, the plurality of images stored in the electronic device, to obtain a first group that meets a first condition. The first condition includes that a similarity between any two images in the first group is greater than or equal to a first threshold, that is, the any two images in the first group meet a similarity condition. For an example of the first group, refer to an image group A shown in FIG. 5 and an image group B shown in FIG. 6. The image group A shown in FIG. 5 may include four images, namely, an image 501, an image 502, an image 503, and an image 504. The image group B shown in FIG. 6 may include four pictures, namely, an image 601, an image 602, an image 603, and an image 604.

This application is not limited to the foregoing enumerated cases. In some embodiments, any image processed by the electronic device may also be a frame of image extracted from a stored video. For example, the electronic device may extract, from the video by using an AI technology, at least one frame of image whose similarity to the first image is greater than or equal to the first threshold. The at least one frame of image and the first image belong to one first group.

Figure 6:
Figure 7:
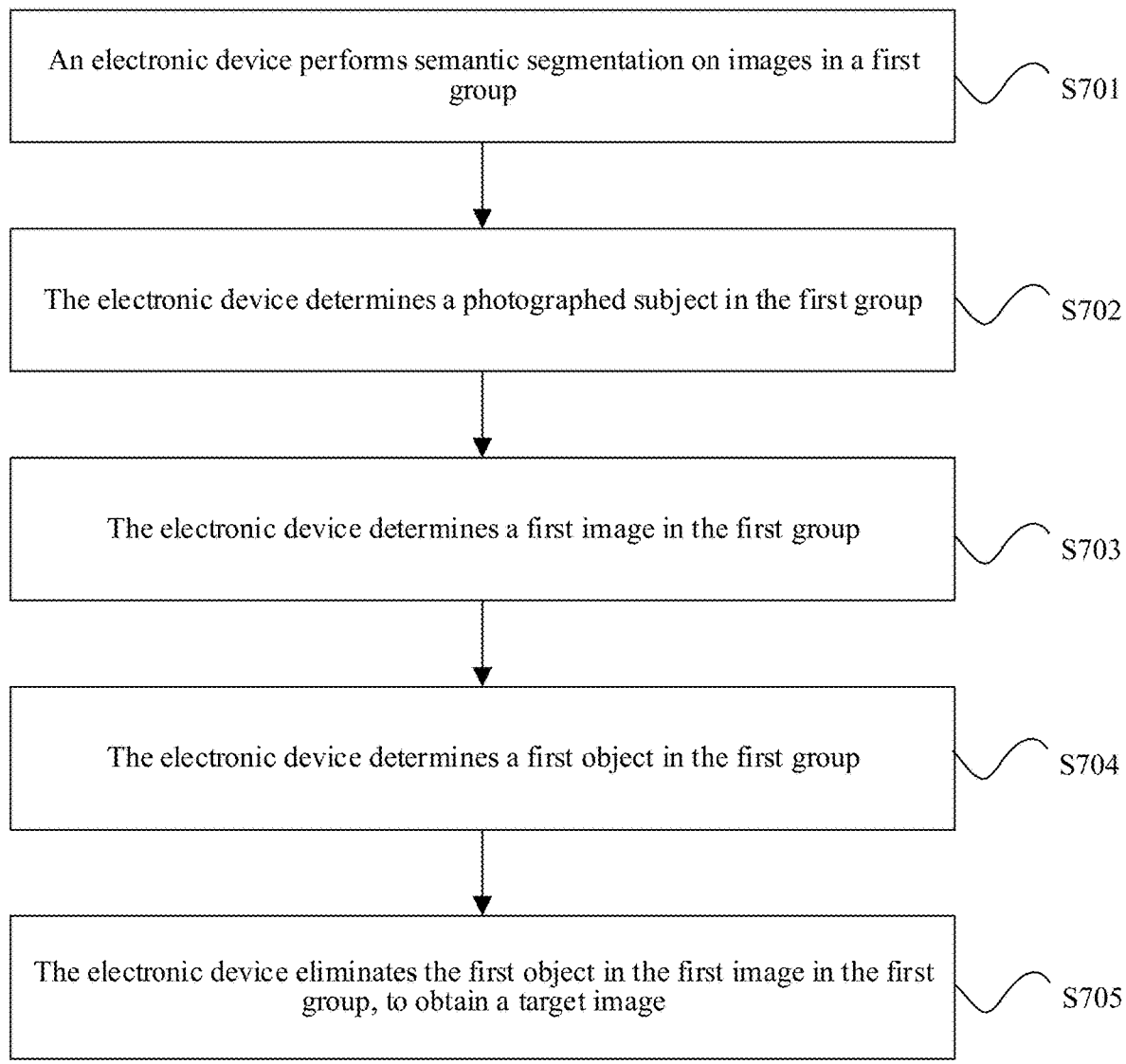
FIG. 7 is a schematic flowchart of an image processing method according to an embodiment of this application.

In this application, the electronic device may eliminate a moving object from each of the obtained first groups. An example process is shown in FIG. 7. FIG. 7 is illustrated by using an example in which the image group B shown in FIG. 6 is a first group.

Refer to FIG. 7. FIG. 7 shows an example of a schematic flowchart of an image processing method. The method may be applied to the electronic device 100 shown in FIG. 1. The method may be further applied to the electronic device 100 shown in FIG. 2. The method includes, but is not limited to, the following operations.

S701: An electronic device performs semantic segmentation on images in a first group.

Specifically, the electronic device may identify an object included in the image by performing semantic segmentation. An example is shown in FIG. 8.

Figure 8:
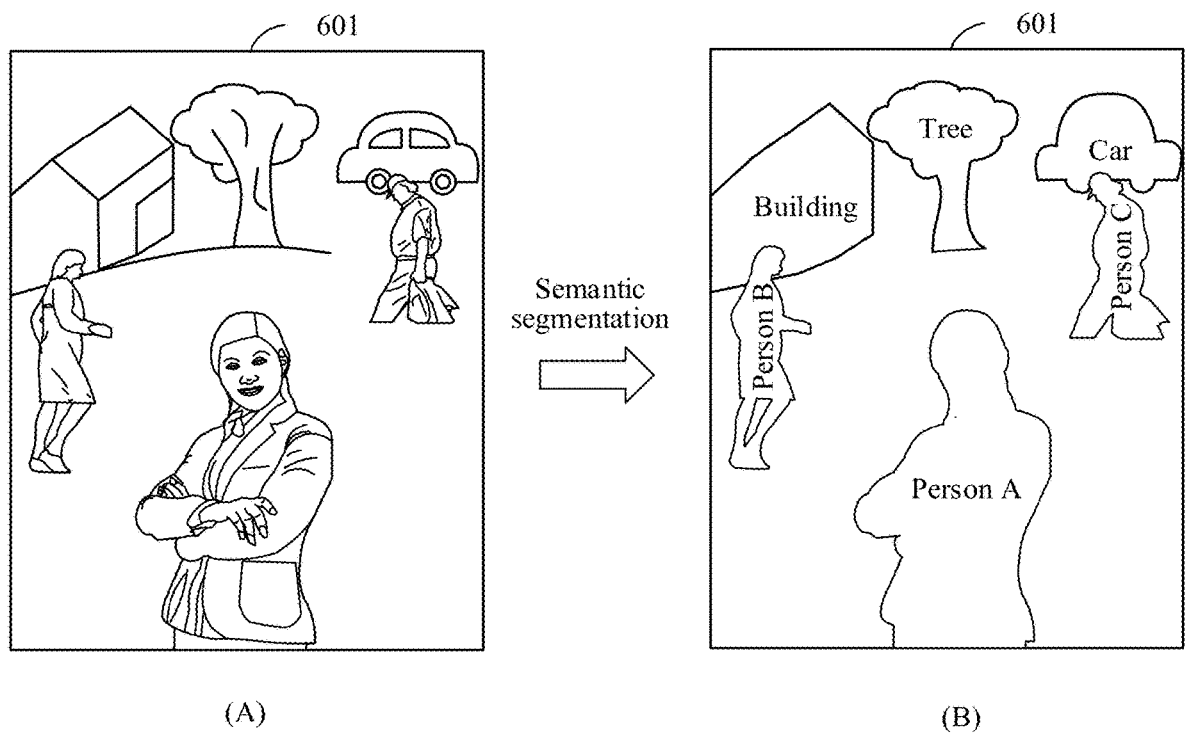
FIG. 8 and FIG. 9, FIG. 10A to FIG. 10D, and FIG. 11 are schematic diagrams of some image processing processes according to an embodiment of this application.

Refer to FIG. 8. FIG. 8 shows an example of comparison before and after semantic segmentation. FIG. 8 is illustrated by using an example in which semantic segmentation is performed on the image 601 shown in FIG. 6. An image shown in (A) in FIG. 8 is an image 601 before semantic segmentation, and an image shown in (B) in FIG. 8 is an image 601 after semantic segmentation. As shown in (B) in FIG. 8, after semantic segmentation, the image 601 may include a person A, a person B, a person C, a building, a tree, and a car. A process in which the electronic device performs semantic segmentation on another image in the image group B shown in FIG. 6 is similar to that in FIG. 8. The image 602 further includes a balloon. The image 603 is consistent with the image 601, and the image 604 does not include a car.

This application is not limited to the example shown in FIG. 8. In some embodiments, after semantic segmentation, an object included in an image is, for example, a person, a building, a car, a green plant (including a grassland, a tree, and a flower), food, a pet, water, a beach, or a mountain peak. A specific type of the object is not limited in this application.

S702: The electronic device determines a photographed subject in the first group.

Specifically, any image in the first group includes a photographed subject. In this application, an object included in each image in the first group may be referred to as a first to-be-detected object. For each first to-be-detected object, the electronic device may first obtain at least one of the following: a definition, an occupied area, whether the first to-be-detected object belongs to a first preset category, and whether a region in which a focus point is located is in a region in which the first to-be-detected object is located. Then, a first to-be-detected object that meets a first preset condition is determined as the photographed subject based on the obtained content. The first preset condition may include at least one of the following: the definition is greater than or equal to a first preset threshold, the occupied area is greater than or equal to a second preset threshold, first to-be-detected object belongs to the first preset category, and the region in which a focus point is located is in the region in which the first to-be-detected object is located. The definition may be represented by, but is not limited to, a grayscale difference between adjacent pixels or a gradient in an image. For example, a definition of an image is represented, for example, a value calculated by using an algorithm such as a Brenner gradient function, a Tenengrad gradient function, or a Laplacian gradient function. A larger obtained value indicates a higher definition of the image, and a smaller obtained value indicates a lower definition of the image.

The first preset category may be a category to which an object belongs, for example, a person, a pet, a building, or a scenery, that is pre-obtained by the electronic device based on information such as a historical image. For example, assuming that the electronic device may obtain a facial feature vector of a first person based on the historical image, and identify the first person as a child (for example, the user directly marks an identity of the person). When a facial feature vector of the first to-be-detected object matches the facial feature vector of the first person (for example, when a similarity is greater than a third preset threshold), the electronic device may identify the object as a child, that is, the first to-be-detected object belongs to the first preset category. The facial feature vector represents face information of the user, and for example, may include facial features, an area and shape of a face, and the like.

It should be noted that, the definition and the occupied area may be a definition and an occupied area of a first to-be-detected object in any image in the first group, and the region in which a focus point is located is also a region in which a focus point is located in any image in the first group. This application is not limited thereto. The definition and the occupied area may also be a definition and an occupied area of a first to-be-detected object in a preset quantity of images in the first group, and the region in which a focus point is located is also a region in which a focus point is located in a preset quantity of images in the first group. This is not limited in this application.

For example, it is assumed that the first preset condition includes that the occupied area is the largest, and the first to-be-detected object belongs to the first preset category. It is assumed that the first preset category includes a person and a pet. However, in the image group B shown in FIG. 6, objects included in each image include a person A, a person B, a person C, a building, and a tree. The person A occupies a largest area, and the person A belongs to the first preset category. Therefore, the electronic device may determine the person A as a photographing subject of the image group A.

In some embodiments, any first to-be-detected object in the first group may have a corresponding priority, and the electronic device may determine a first to-be-detected object with a highest priority as the photographing subject of the first group. The priority of the object may be determined based on at least one of the following: a definition, an occupied area, whether the object belongs to the first preset category, and whether a region in which a focus point is located is in a region in which the first to-be-detected object is located.

For example, the priority of the first to-be-detected object is determined based on the definition, the occupied area, and whether the first to-be-detected object belongs to the first preset category. The priority of the first to-be-detected object may be represented as W. When W is calculated, the definition is represented as qa and has a weight of wa. When W is calculated, the occupied area is represented as qb and has a weight of wb. When W is calculated, whether the first to-be-detected object belongs to the first preset category is represented as qc and has a weight of wc. Therefore, an expression of W may be as follows:

$$W = wa \times qa + wb \times qb + wc \times ac$$

wa+wb+wc=1. For example, wc>wb>wa, but this application is not limited thereto, and wc>wa>wb may also exist. A specific value of the weight is not limited in this application.

A value of qc may be 0 or 1. When the value of qc is 0, it indicates that the first to-be-detected object does not belong to the first preset category. When the value of qc is 1, it indicates that the first to-be-detected object belongs to the first preset category. This application is not limited thereto. When qc has different values, a category to which the first to-be-detected object belongs may be further indicated. A manner of determining values of qa, qb, and qc is not limited in this application.

For example, the priority of the first to-be-detected object is determined only by definition of the first to-be-detected object. A higher definition of the first to-be-detected object indicates a higher priority of the first to-be-detected object.

For example, the priority of the first to-be-detected object is determined only by the occupied area. A larger occupied area indicates a higher priority of the first to-be-detected object.

For example, the priority of the first to-be-detected object is determined only by whether the first to-be-detected object belongs to the first preset category. In some embodiments, the priority of the first to-be-detected object may also be determined by a category to which the first to-be-detected object belongs. When the first to-be-detected object belongs to the first preset category, the priority of the object may be raised. In some embodiments, assuming that the first preset category includes a person and a building, the priority is greatly raised when the first to-be-detected object is a person, and the priority is slightly raised when the first to-be-detected object is a building. In some embodiments, assuming that the first preset category includes a person and includes an identity of the person, namely, a relative and a friend, the priority is greatly raised when the first to-be-detected object is a relative, the priority is slightly raised when the first to-be-detected object is a friend, and the priority is minimally raised when the first to-be-detected object is only a person but is not a relative or a friend.

S703: The electronic device determines a first image in the first group.

Specifically, the electronic device may determine, from the first group, a first image that meets a second condition. The second condition includes at least one of the following: a definition of a photographed subject in the first image is greater than or equal to a second threshold, a quantity of other objects than the photographed subject in the first image is less than a third threshold, the photographed subject in the first image is not blocked, and a status of the photographed subject in the first image is a preset state. The electronic device may determine the quantity of other objects than the photographed subject based on a semantic segmentation result. This application is not limited thereto. The electronic device may also identify, by using a technology such as AI, an object included in an image, to determine a quantity of other objects.

The electronic device may determine, based on whether a similarity of the photographed subject in the first group changes, whether the photographed subject is blocked. For example, based on the first group, the electronic device may obtain a similarity between a photographed subject in any image and another image. When the similarity is less than a fourth preset threshold, the electronic device may determine that the photographed subject in a current image has a significant feature change, that is, determine that the photographed subject in the current image is blocked.

The electronic device may identify the status of the photographed subject by using a technology such as artificial intelligence (AI). For example, when the photographing subject is a person, the status of the photographed subject may include an expression such as smiling or crying, and a posture such as standing upright, leaning, or squatting. When the photographed subject is a pet such as a cat or a dog, the status of the photographed subject may include a posture such as lying down, standing, or running. When the photographed subject is an object such as a car or a bicycle, the status of the photographed subject may include stopping, driving, and the like.

For example, in the image group B shown in FIG. 6, the photographed subject is the person A. It is assumed that the second condition includes that the quantity of other objects than the photographed subject is the smallest, and the photographed subject is not blocked. The person A in the image 602 is blocked, and therefore the image 602 is not considered. In addition to the person A, the image 601 and the image 603 further include five objects, namely, the person B, the person C, the car, the building, and the tree. In addition to the person A, the image 604 further includes four objects, namely, the person B, the person C, the building, and the tree, and the car is not included. Therefore, the electronic device may determine the image 604 as a first image of the image group B.

In some embodiments, any image in the first group may have a corresponding priority, and the electronic device may determine an image with a highest priority as the first image in the first group. The priority of the image may be determined by at least one of the following: a definition of the photographed subject, a quantity of other objects than the photographed subject, whether the photographed subject is blocked, and a status of the photographed subject.

For example, the priority of the image is determined by the definition of the photographed subject in the image, the quantity of other objects than the photographed subject, and whether the photographed subject is blocked. The priority of the image may be represented as U. When U is calculated, the definition of the photographed subject is represented as qd and has a weight of wd. When U is calculated, whether the photographed subject is blocked is re as qe and has a weight of we. When U is calculated, the quantity of other objects than the photographed subject is represented as qf and has a weight of wf. Therefore, an expression of U may be as follows:

$$U = wd \times qd + we \times qe + wf \times qf$$

wd+we+wf=1. For example, wf>we>wd, but this application is not limited thereto, and wf>wd>we may also exist. A specific value of the weight is not limited in this application.

A value of qf may be less than or equal to 0. When the value of qf is 0, it indicates that the quantity of other objects than the photographed subject is 0. When the value of qf is less than 0, a smaller qf indicates a larger quantity of other objects than the photographed subject, and a larger qf indicates a smaller quantity of other objects than the photographed subject. This application is not limited thereto. The value of qf may also be greater than or equal to 0. A manner of determining values of qd, qe, and qf is not limited in this application.

For example, the priority of the image is determined only by the definition of the photographed subject in the image. A higher definition of the photographed subject in the image indicates a higher priority of the image.

For example, the priority of the image is determined only by whether the photographed subject in the image is blocked. The priority of the image may be raised when the photographed subject in the image is not blocked. The priority of the image may be lowered when the photographed subject in the image is blocked.

For example, the priority of an image is determined only by the status of the photographed subject. It is assumed that the photographed subject in the image is a person, and facial features, an expression, and the like of the person are the status of the photographed subject. The priority of the image may be raised when eyes of the person are open. The priority of the image is raised when the expression of the person is smiling.

For example, the priority of the image is determined only by the quantity and an area of other objects than the photographed subject in the image. A smaller quantity of other objects than the photographed subject in the image indicates a higher priority of the image, and a smaller area of other objects than the photographed subject in the image indicates a higher priority of the image.

S704: The electronic device determines a first object in the first group.

Specifically, in this application, any object other than the photographed subject in the first group may be referred to as a third object. The electronic device may obtain a distance between a third object in the first image and a third object in another image in the first group. The electronic device may determine the third object as the first object when the distance is greater than or equal to a fifth preset threshold. The first object is a to-be-eliminated moving object.

In some embodiments, when determining the first object in the first group, the electronic device first may perform coordinate registration, that is, configure images in the first group in a same coordinate system. The coordinate system may be a two-dimensional coordinate system, or may be a three-dimensional coordinate system. In this application, the two-dimensional coordinate system is used as an example for description. In this application, any two images in the first group may be referred to as a first to-be-detected image and a second to-be-detected image. The following describes a coordinate registration process of the first to-be-detected image and the second to-be-detected image by using an example.

The electronic device may first obtain at least one first key point in the first to-be-detected image and at least one second key point in the second to-be-detected image. A quantity of first key points is the same as a quantity of second key points. One first key point corresponds to one second key point, that is, a similarity between the first key point and the second key point is greater than or equal to a sixth preset threshold. For example, the first to-be-detected image is the image 604, and the first key point is a central point of a left eye of a person A in the image 604; and the second to-be-detected image is the image 603, and the second key point is a central point of a left eye of a person A in the image 603. The quantity of first key points and the quantity of second key points may be represented as n. In this case, the first key point included in the first to-be-detected image may be represented as a sequence $P_1\{p_{11}(x_{11}, y_{11}), p_{12}(x_{12}, y_{12}), \ldots, p_{1n}(x_{1n}, y_{1n})\}$, and the second key point included in the second to-be-detected image may be represented as a sequence $P_2\{p_{21}(x_{21}, y_{21}), p_{22}(x_{22}, y_{22}), \ldots, p_{2n}(x_{2n}, y_{2n})\}$. Assuming that a coordinate system in which the first to-be-detected image is located is a standard coordinate system, the second to-be-detected image may be rotated and translated to be in the standard coordinate system. A rotation value may be represented as $R(x_r, y_r)$, and a translation value may be represented as $T(x_t, y_t)$. $P_1$, $P_2$, R, and T satisfy the following formula:

$$P_1 = P_2 \times [R/T]$$

The electronic device may obtain a rotation value R and a translation value N through matrix inversion, and then rotate the second to-be-detected image based on R and translate the second to-be-detected image based on N. In this case, the first to-be-detected image and the second to-be-detected image are in a same standard coordinate system, and the first key point overlaps the corresponding second key point.

In some embodiments, to make the established standard coordinate system consistent with the world coordinate system as much as possible, selected first key point and second key point may be located on the photographed subject, or may be located on one or more objects whose locations at any time point are unchanged, for example, a building, a green plant (including a grassland, a tree, and a flower), a beach, or a mountain peak.

The electronic device may obtain central points of third objects in different images in the foregoing standard coordinate system, and calculate distances between the central points. When any distance is greater than or equal to the fifth preset threshold, the electronic device may determine that the third object is the to-be-eliminated moving object (that is, the first object). An example is shown in FIG. 9.

Figure 9:
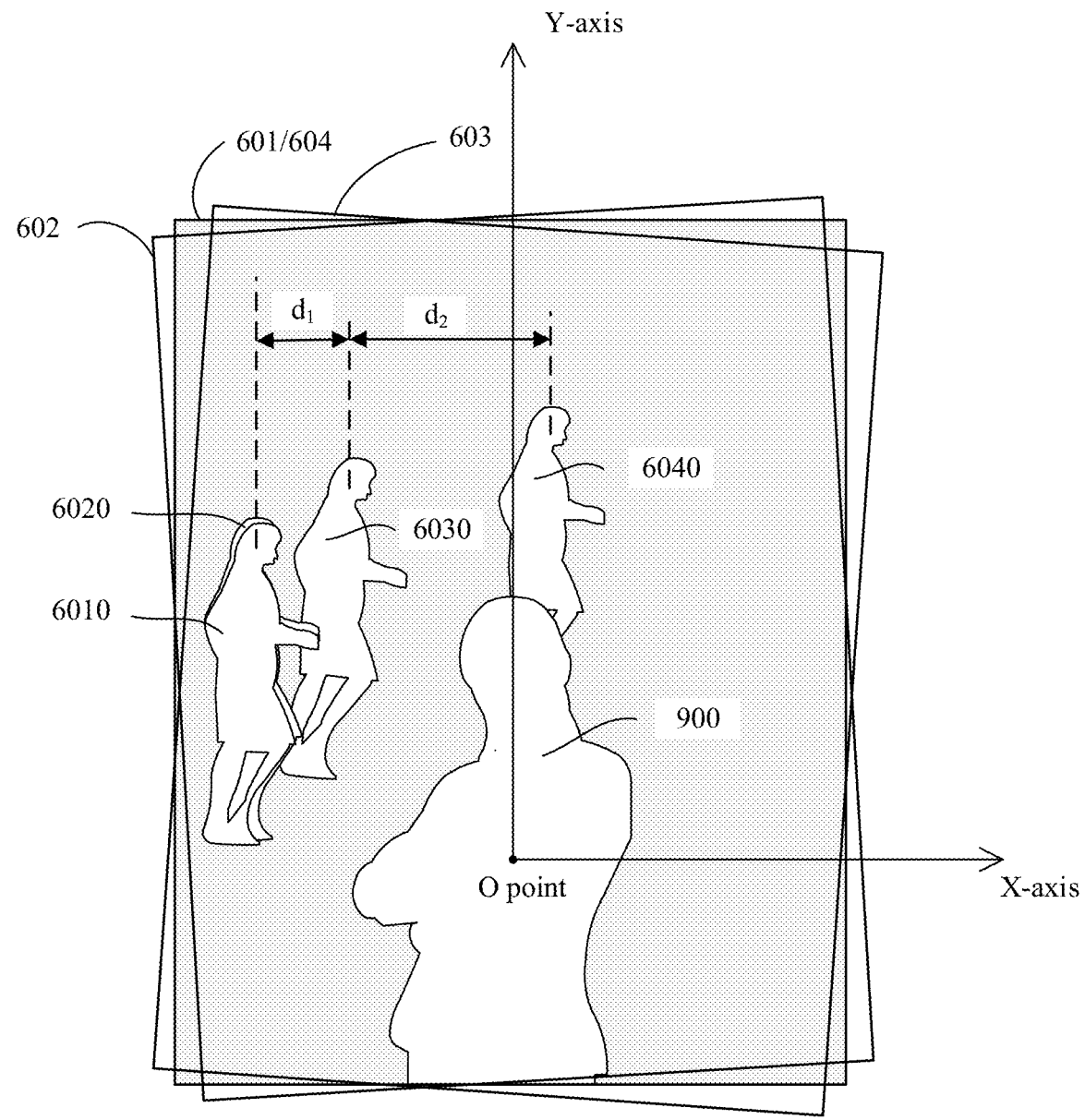

Refer to FIG. 9. FIG. 9 is schematic diagram of an example of determining a first object. FIG. 9 is illustrated by using an example in which a to-be-determined third object is the person B in the image group A shown in FIG. 6.

As shown in FIG. 9, it is assumed that a two-dimensional coordinate system established by using an O point as a coordinate origin is the standard coordinate system obtained through coordinate registration. An image whose background is gray is the first image (that is, the image 604), a region 900 is a region in which the person A (that is, the photographed subject) in the image 604 is located, and a point O is a central point of the person A in the image 604. A central point of a person A in another image of the image group A overlaps the point O, and a region of the person A also overlaps the region 900. A region of the image 601 completely overlaps a region of the image 604.

As shown in FIG. 9, a region 6010 is a region in which the person B in the image 601 is located, and a region 6020 is a region in which the person B in the image 602 is located. A degree of overlapping between the region 6010 and the region 6020 is greater than the sixth preset threshold. Therefore, the electronic device may consider that displacement of the person B in the image 601 and the image 602 is 0. A region 6030 is a region in which the person B in the image 603 is located, and a distance between a central point of the region 6010 or the region 6020 and a central point of the region 6030 is a first distance $d_1$. A region 6040 is a region in which the person B in the image 604 is located, and a distance between the central point of the region 6030 and a central point of the region 6040 is a second distance $d_2$. Correspondingly, a distance between the central point of the region 6010 or the region 6020 and the central point of the region 6040 is $d_1+d_2$. When any one of $d_1$, $d_2$, and $d_1+d_2$ is greater than a second distance threshold, the electronic device may identify the person B as the to-be-eliminated moving object (that is, the first object).

It may be understood that, the electronic device may also identify, based on S704, the person C and the car in the image group B shown in FIG. 6 as the to-be-eliminated moving object (that is, the first object). An example process is similar to that in the embodiment shown in FIG. 9, and details are not described herein again.

In some embodiments, if the first image includes a third object, but another image other than the first image in the first group does not include the third object, the electronic device may also determine that the third object is the to-be-eliminated moving object (that is, the first object).

In this application, a central point of any object may be a central point of a rectangle when the object is converted into the rectangle. When the object is converted into the rectangle, a widest line segment of the object may be used as one group of opposite edges of the rectangle, and a highest line segment may be used as the other group of opposite edges of the rectangle. This application is not limited thereto. In some embodiments, a center of gravity of an irregular object may be obtained as a central point of the object.

In some embodiments, the electronic device may first set a focal length of each image in the first group to a same focal length, and then perform coordinate registration, to reduce a processing error.

S705: The electronic device eliminates the first object in the first image in the first group, to obtain a target image.

Specifically, the electronic device may first determine, from the first group, a second image including a second object. The second image is an image other than the first image in the first group. There is at least one second image, and the second object is used to cover or replace the first object in the first image. A position of the second object in the standard coordinate system obtained through coordinate registration is the same as a position of the first object in the standard coordinate system.

Figure 10A:
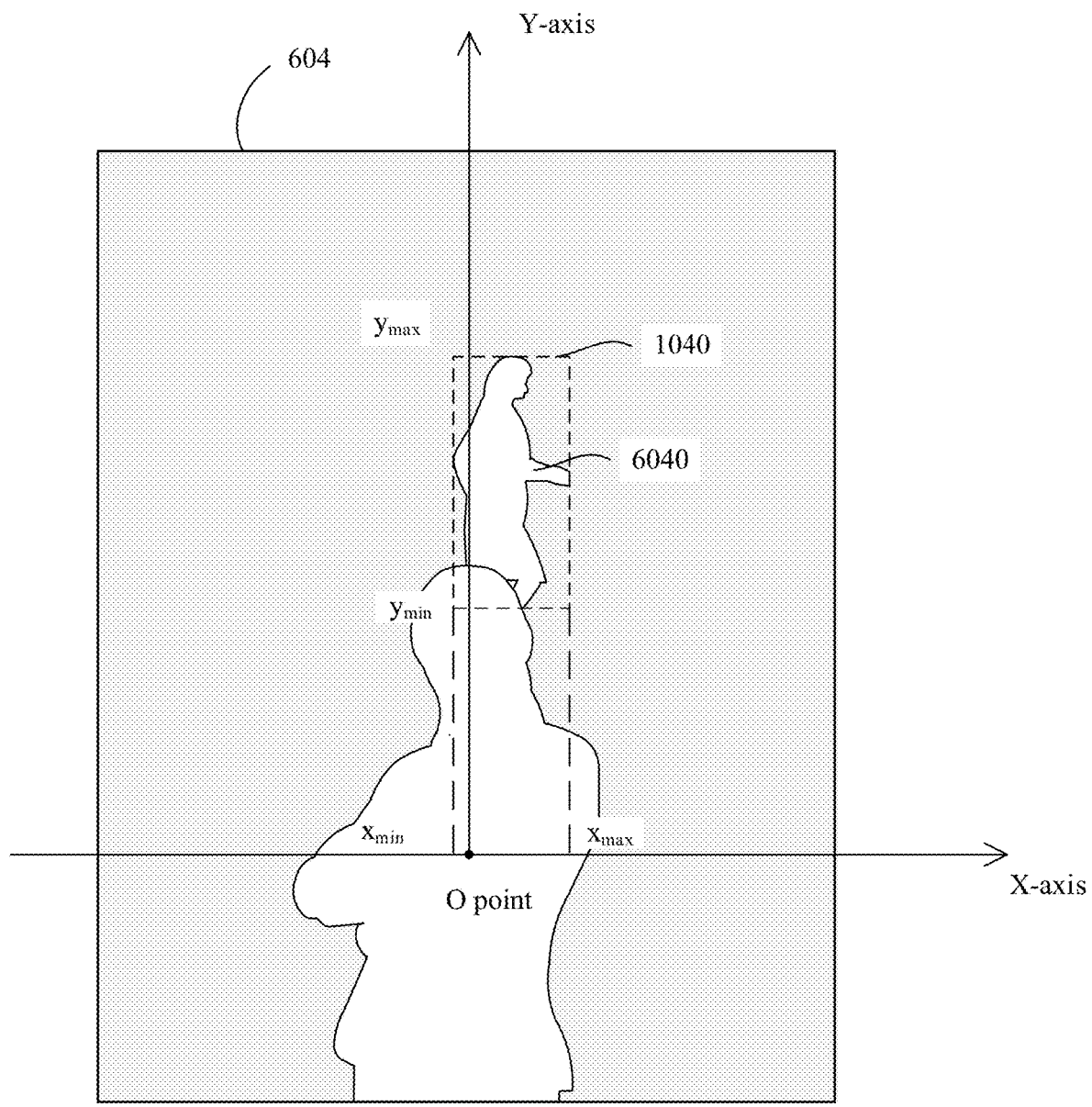
Figure 10B:
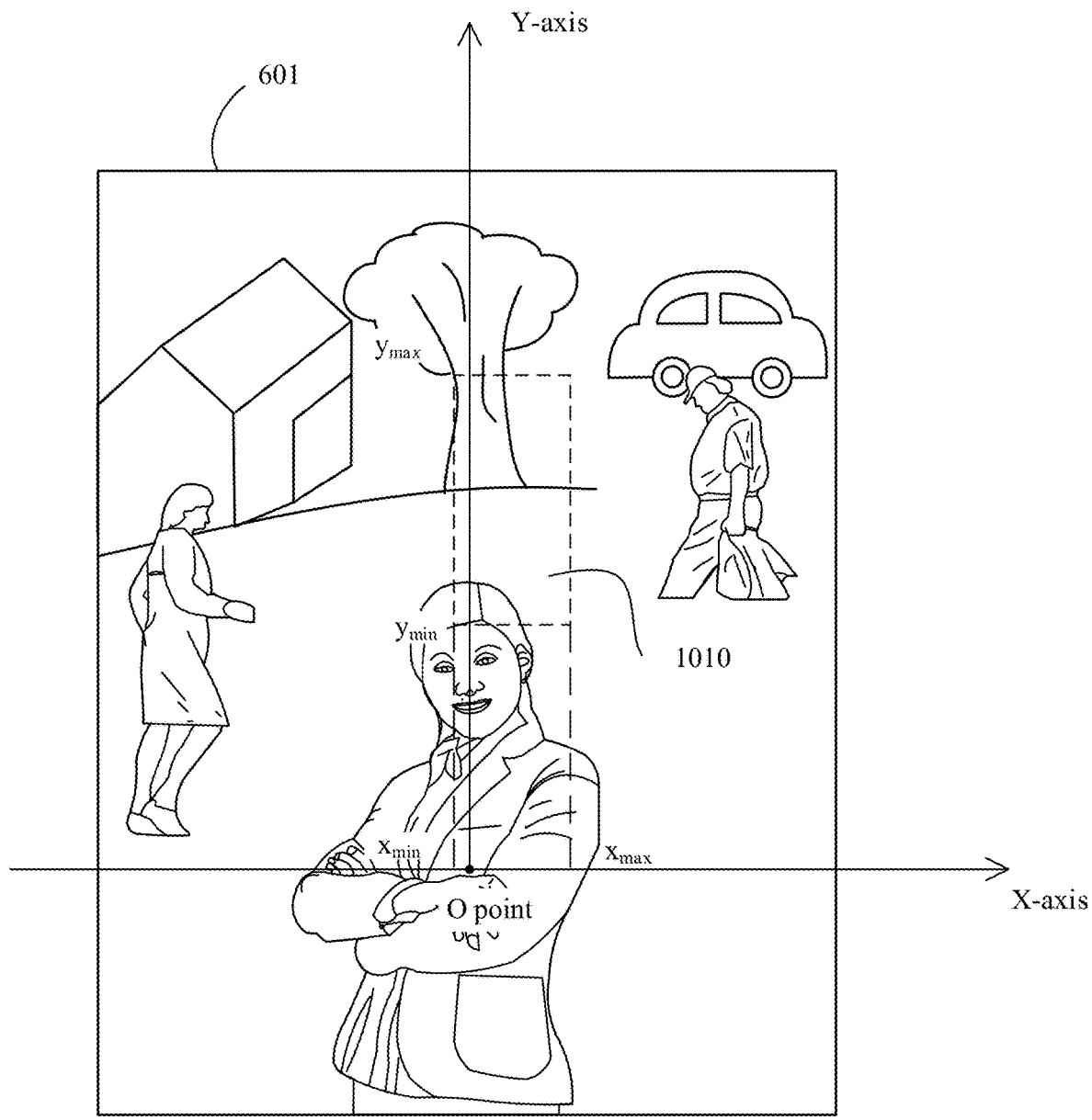
Figure 10C:
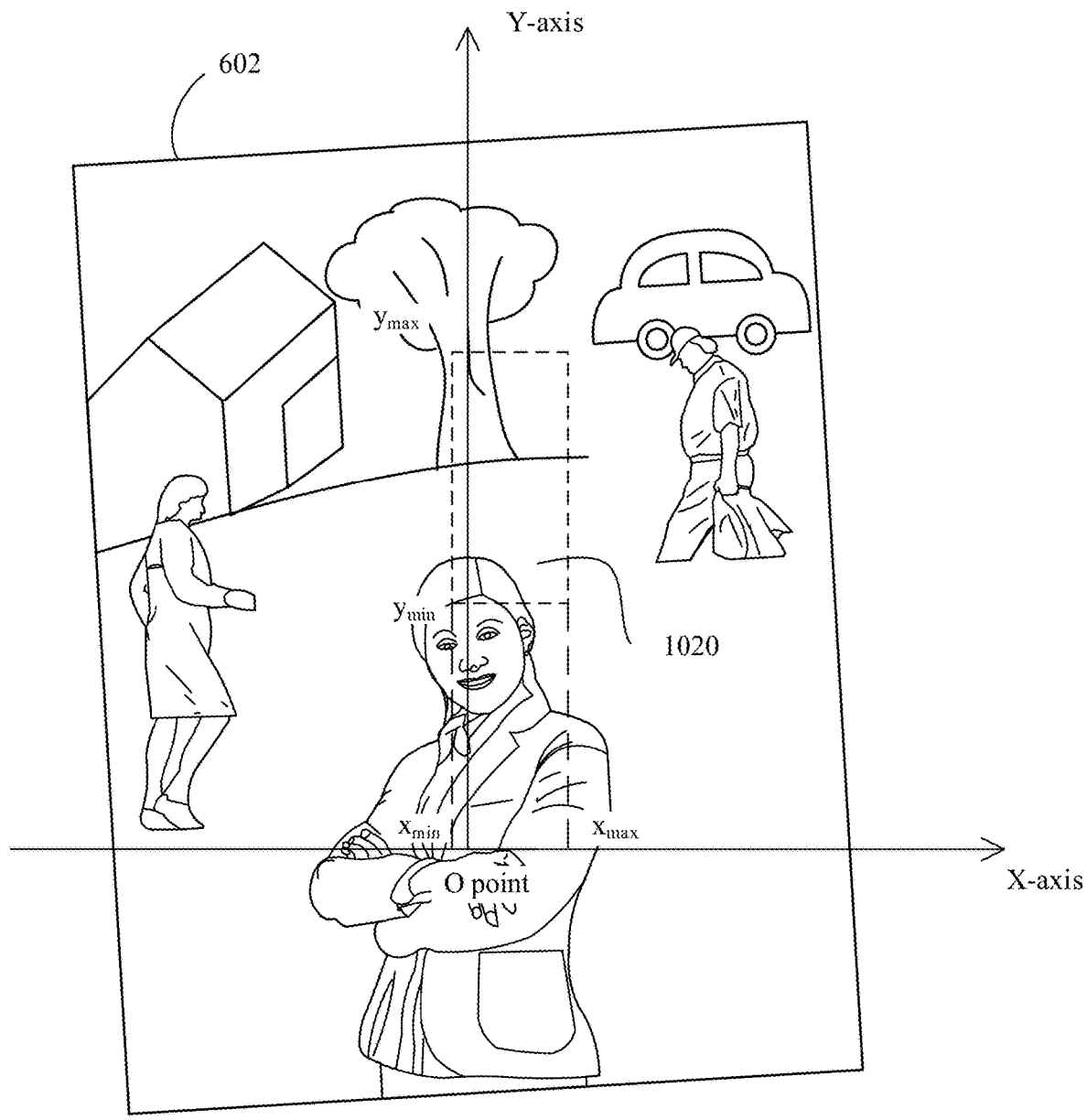
Figure 10D:
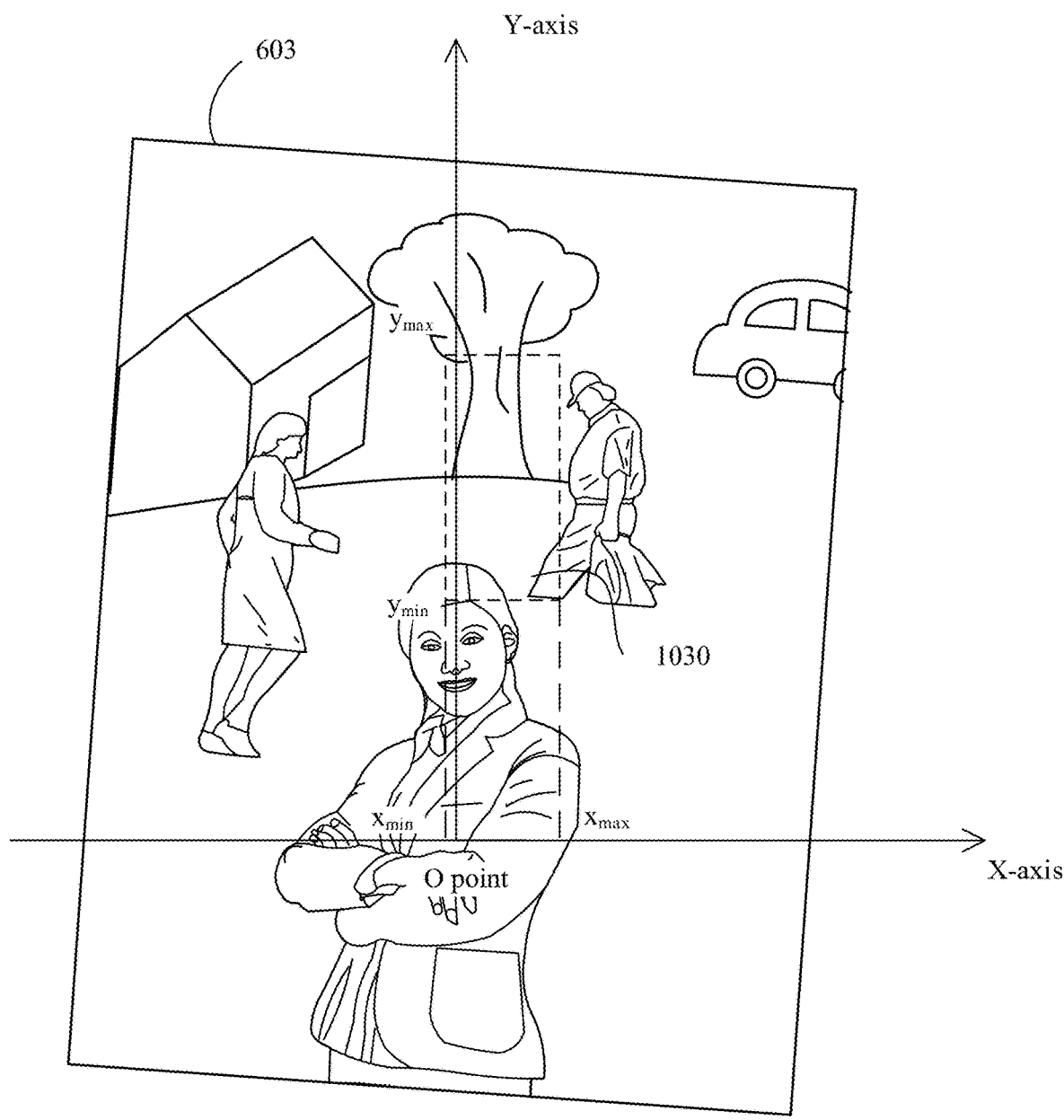

For example, as shown in FIG. 9, the first image (that is, the image 604) includes a to-be-eliminated moving object, namely, a person B. A region in which the person B is located is the region 6040. The electronic device may convert the irregular region 6040 into a rectangle 1040 shown in FIG. 10A. A position of the rectangle 1040 may be represented as $S\{x_{min}, x_{max}, y_{min}, y_{max}\}$. In this case, the first object may be equivalent to the rectangle 1040. The electronic device may determine, based on the standard coordinate system, a region in which a position S in another image of the first group is located. Examples are shown in FIG. 10B to FIG. 10D. A region 1010 shown in FIG. 10B is a region in which a position S in the image 601 is located, a region 1020 shown in FIG. 10C is a region in which a position S in the image 602 is located, and a region 1030 shown in FIG. 10D is a region in which a position S in the image 603 is located. Assuming that a similarity between the region 1010 and the region 1020 is greater than or equal to a seventh preset threshold, and both a similarity between the region 1030 and the region 1010 and a similarity between the region 1030 and the region 1020 are less than the seventh preset threshold, either of the region 1010 and the region 1020 may be used as the second object.

Figure 11:
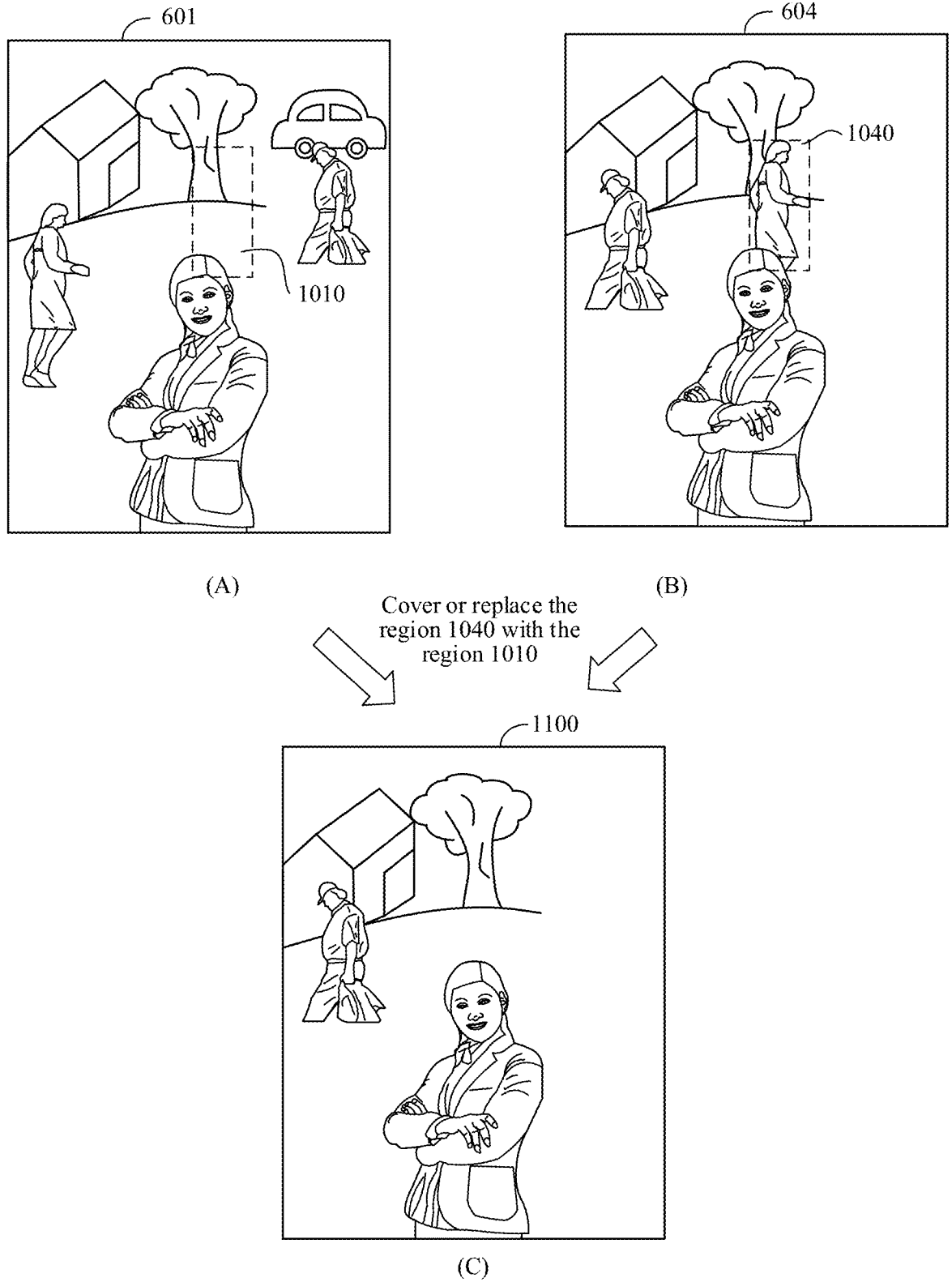

It is assumed that the image 601 is the second image determined by the electronic device, and the region 1010 is the second object determined by the electronic device. As shown in FIG. 11, the electronic device may use a region 1010 (that is, a second object) in an image 601 (that is, a second image) shown in (A) in FIG. 11 to cover or replace a region 1040 (that is, a first object) in an image 604 (that is, a first image) shown in (B) in FIG. 11, to obtain a target image 1100 shown in (C) in FIG. 11. The target image 1100 does not include a person B (that is, a moving object).

This application is not limited to the foregoing enumerated cases. In some embodiments, there may be a plurality of second images, and the second object may also be image content obtained by splicing the plurality of second images.

In some embodiments, after the electronic device covers or replaces the first object with the second object, the electronic device may further process an edge of the second object in the target image, so that the second object and other image content of the target image are more coordinated, transition is more natural, authenticity is higher, and user experience is better.

Figure 12:
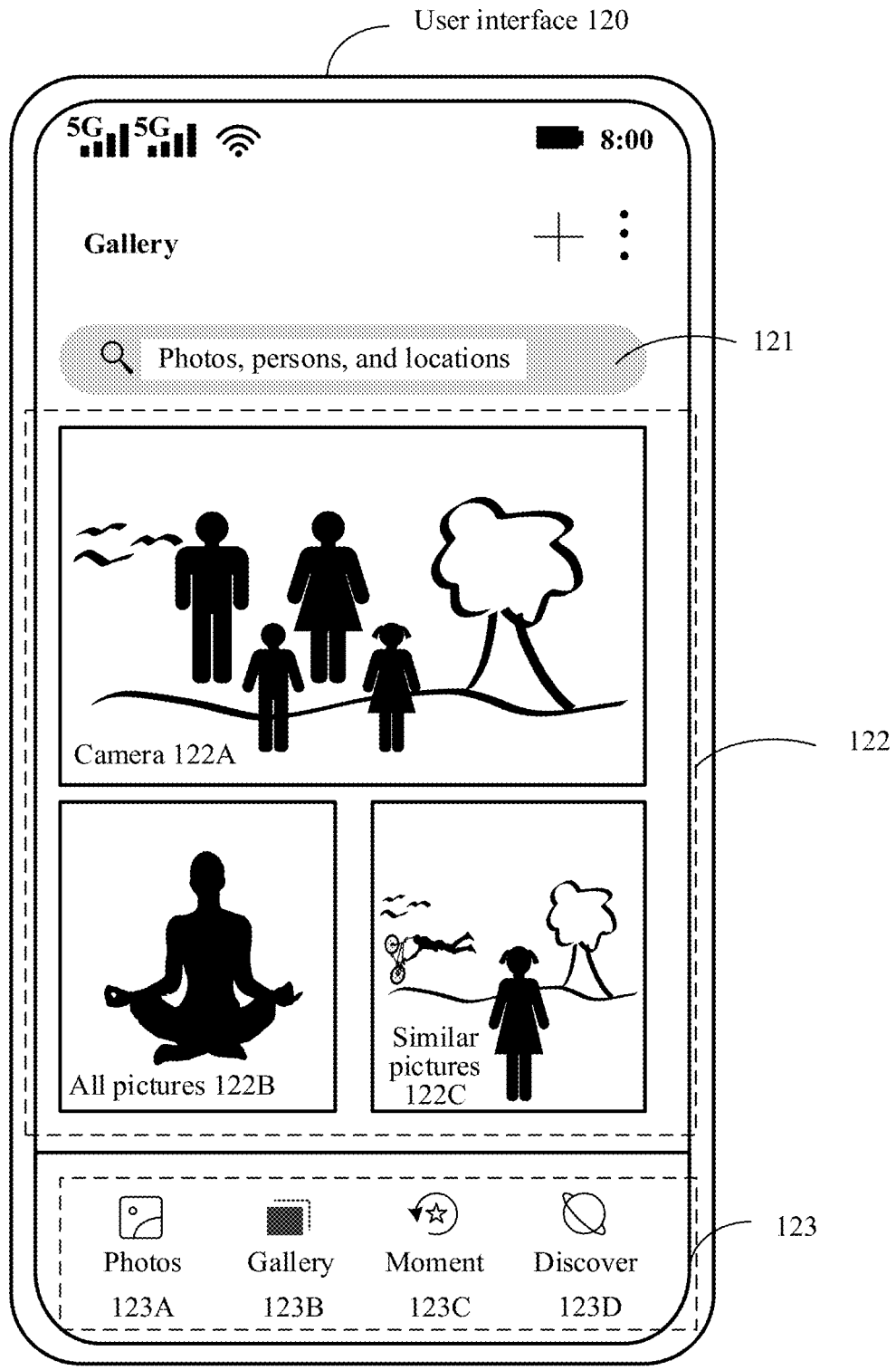
Figure 13A:
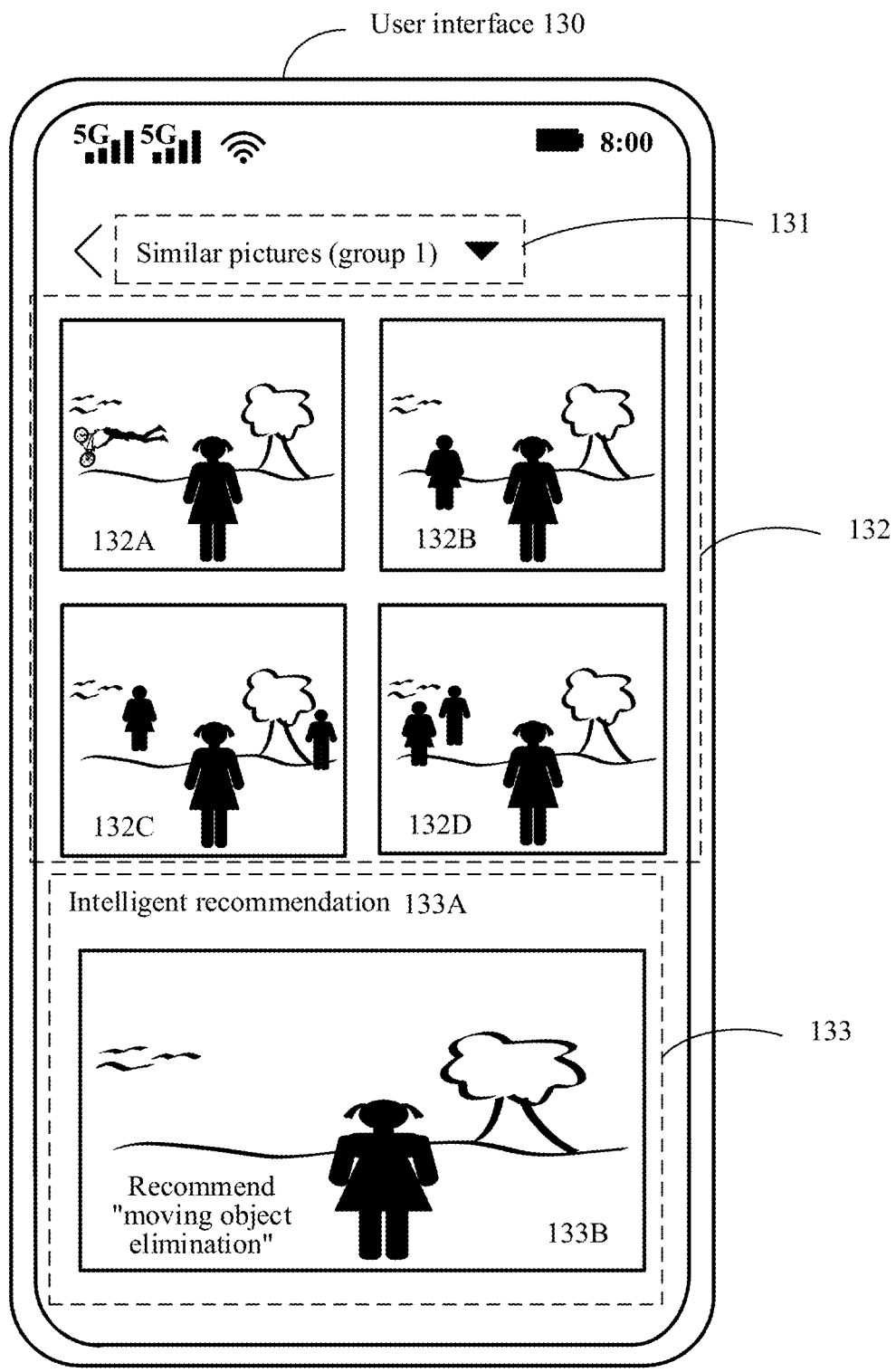
Figure 13B:
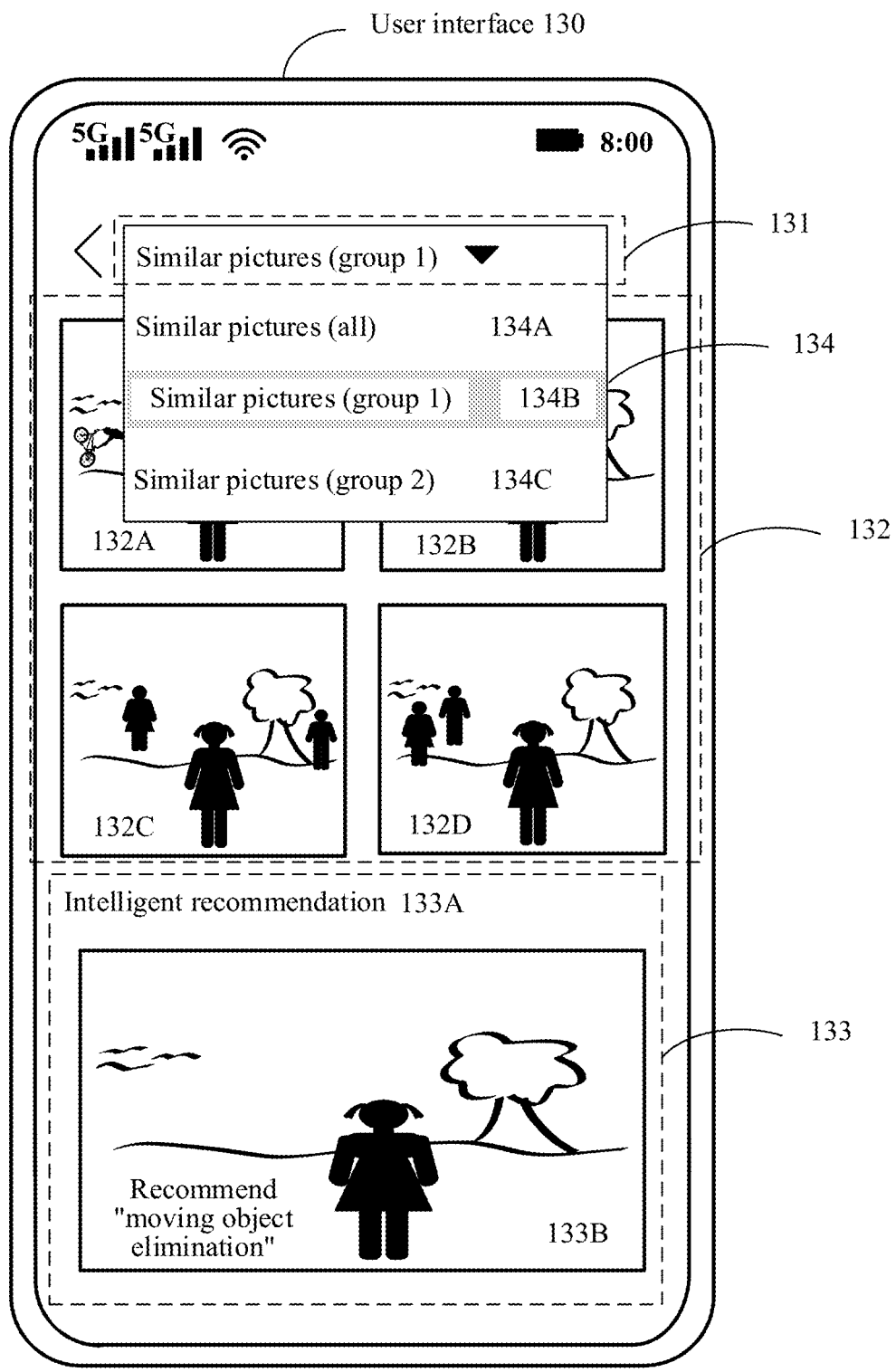

In this application, the electronic device may obtain a target image according to the embodiments shown in FIG. 4 to FIG. 9, FIG. 10A to FIG. 10D, and FIG. 11, and recommend the target image to the user. Examples are shown in FIG. 12, FIG. 13A, and FIG. 13B. The process of eliminating a moving object does not need to be manually triggered by the user, which is more convenient for the user to use.

Refer to FIG. 12. FIG. 12 shows an example of a user interface 120 of a gallery application on an electronic device such as a smartphone. The electronic device may detect a touch operation (for example, a tap operation) performed on an icon of the gallery application. The icon of the gallery application may be on a desktop of the electronic device (which may also be referred to as a home screen of the electronic device). The electronic device may display the user interface 120 in FIG. 12 in response to the touch operation. The user interface 120 may be a main interface of the gallery application. In other words, the user may tap the icon of the gallery application to open the user interface 120 of the gallery application. This application is not limited thereto. The user may further open the user interface 120 in another application. For example, the user taps an album control in a social application to open the user interface 120, and the user taps a control 305 in the user interface 30 of a camera application to open the user interface 120.

As shown in FIG. 12, the user interface 120 may include a control 121, an album list 122, and a gallery function list 123.

The control 121 may be referred to as a search bar 121. The search bar 121 may be used to receive information entered by the user. The electronic device may search, based on the information entered by the user, a picture or a video stored in the electronic device, to obtain a picture or a video that matches the information entered by the user, and display the matched picture or video to the user.

The album list 122 may include one or more image classifications, for example, may include a classification of a camera 122A, a classification of all pictures 122B, a classification of similar pictures 122C, and the like. Each image classification may include one or more pictures or videos. The electronic device may classify the pictures or videos into the one or more image classifications based on sources, content, and the like of the pictures or videos. For example, a picture and a video that are captured by the electronic device through the camera 193 belong to the classification of a camera 122A. Pictures that are photographed by the electronic device through the camera 193, obtained from another device, and downloaded from the Internet belong to the classification of all pictures 122B. The classification of similar pictures 122C may include images of at least one first group obtained by the electronic device by grouping a plurality of stored pictures. The following embodiment is described by using an example in which the classification of similar pictures 122C includes two first groups, namely, a group 1 and a group 2, where the group 1 is the image group A shown in FIG. 5.

The gallery function list 123 may include one or more function options, for example, may include a photo function option 123A, a gallery function option 123B, a moment function option 123C, and a discovery function option 123D. The electronic device may detect a touch operation (for example, a tap operation) performed by the user on the photo function option 123A, and the electronic device may display, in response to the touch operation, the picture or the video that are captured through the camera 193. This application is not limited thereto. The electronic device may also detect a touch operation (for example, a tap operation) performed by the user on the classification of a camera 122A, and the electronic device may also display, in response to the touch operation, the picture or the video that are captured through the camera 193. When the gallery function option 123B is in a selected state, the electronic device may display the user interface 120 shown in FIG. 12.

Refer to FIG. 13A. FIG. 13A shows an example of another user interface 130 of a gallery application on an electronic device such as a smartphone. The electronic device may detect a touch operation (for example, a tap operation) performed on a classification of similar pictures 122C in the user interface 120 shown in FIG. 12, and the electronic device may display, in response to the touch operation, the user interface 130 shown in FIG. 13A.

As shown in FIG. 13A, the user interface 130 may include a control 131, a similar picture list 132, and a region 133.

The control 131 may display text information, namely, a similar picture (group 1). The electronic device may detect a touch operation (for example, a tap operation) performed by the user on the control 131, and the electronic device may display, in response to the touch operation, a user interface 130 shown in FIG. 13B. The user interface 130 shown in FIG. 13B includes an option list 134. The option list 134 includes similar pictures (all) 134A, similar pictures (group 1) 134B, and similar pictures (group 2) 134C. When the similar pictures (group 1) 134B are in a selected state, the electronic device may display the user interfaces 130 shown in FIG. 13A and FIG. 13B. Images included in the similar picture list 132 of the user interface 130 are images of a first group obtained by the electronic device by performing grouping. The electronic device may detect a touch operation (for example, a tap operation) performed on the similar pictures (all) 134A, and the electronic device may display, in response to the touch operation, images of all first groups (that is, the group 1 and the group 2) obtained through grouping. The electronic device may also detect a touch operation (for example, a tap operation) performed on the similar pictures (group 2) 134C, and the electronic device may display, in response to the touch operation, images of another first group (for example, the image group B shown in FIG. 6) obtained through grouping.

The similar picture list 132 may include an image 132A, an image 132B, an image 132C, and an image 132D. The four images constitute a first group obtained by the electronic device through grouping, namely, images in the image group A shown in FIG. 5.

The region 133 may include a title 133A and a region 133B. The title 133A is used to display text information: Intelligent recommendation. The text information: Recommend "moving object elimination" may be displayed in the region 133B. The electronic device may display, in region area 133B, a thumbnail of a target image obtained by the electronic device by eliminating a moving object based on the group 1 (that is, the image group A shown in FIG. 5). The electronic device may detect a touch operation (for example, a tap operation) performed on the region 133B, and the electronic device may display the target image in response to the touch operation. When the electronic device displays the target image, the user may perform various operations on the target image, for example, operation such as editing, deleting, and selecting.

In some embodiments, the electronic device may also receive a user operation. The user operation is used to select a plurality of images and trigger a function of eliminating a moving object. The electronic device may identify, in response to the user operation, the plurality of images selected by the user as a to-be-processed image group (that is, the first group), and then eliminate a moving object based on the first group. In other words, the electronic device may eliminate a moving object based on the image group manually selected by the user. Examples are shown in FIG. 14(A) and FIG. 14(B) and FIG. 15(A) and FIG. 15(B).

Figure 14A:
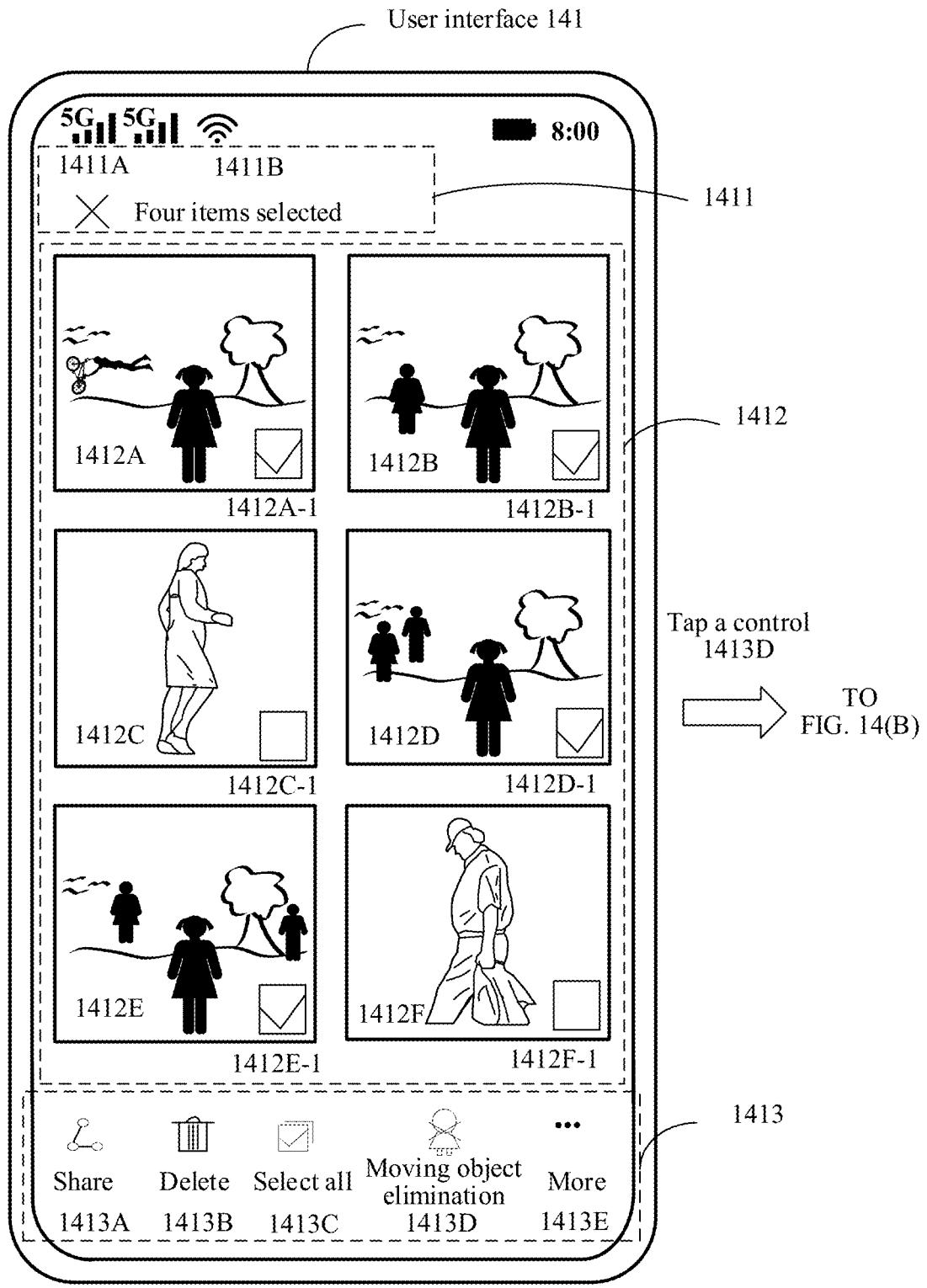
Figure 14B:
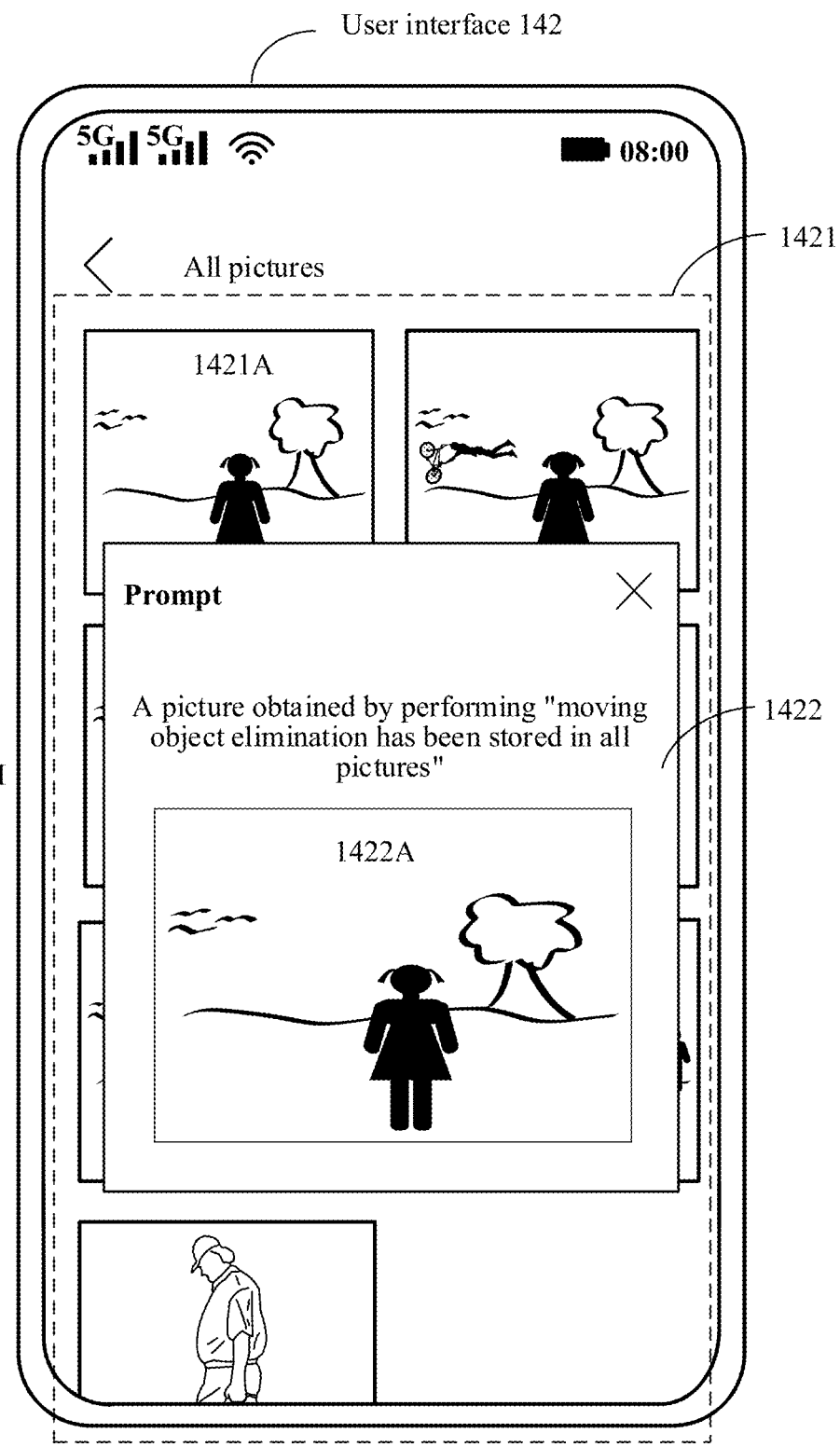

Refer to FIG. 14(A) and FIG. 14(B). FIG. 14(A) and FIG. 14(B) is a schematic diagram of an example of human-computer interaction. A user interface 141 shown in FIG. 14(A) is a user interface in which a plurality of pictures are selected before the user taps a control 1413D, and a user interface 142 shown in FIG. 14(B) is a user interface after the user taps the control 1413D.

As shown in FIG. 14(A), the user interface 141 may include a title 1411, a picture list 1412, and a picture function option 1413.

The title 1411 may include a control 1411A and text information 1411B. The text information 1411B may be determined by a quantity of pictures selected by the user. In the user interface 141 shown in FIG. 14(A), the text information 1411B is: Four items selected, and represents that the quantity of pictures selected by the user is 4.

The picture list 1412 may include one or more pictures, for example, may include a picture 1412A, a picture 1412B, a picture 1412C, a picture 1412D, a picture 1412E, and a picture 1412F. The picture 1412A may include a selection box 1412A-1. The selection box 1412A-1 shown in FIG. 14(A) is in a selected state, and is used to represent that the user has selected the picture 1412A. Similarly, the picture 1412B may include a selection box 1412B-1, the picture 1412D may include a selection box 1412D-1, and the picture 1412E may include a selection box 1412E-1. The selection box 1412B-1, the selection box 1412D-1, and the selection box 1412E-1 shown in FIG. 14(A) are all in a selected state, and are used to represent that the user has selected the picture 1412B, the picture 1412D, and the picture 1412E. The picture 1412C may include a selection box 1412C-1, and the picture 1412F may include a selection box 1412F-1. Both the selection boxes 1412C-1 and 1412F-1 shown in FIG. 14(A) are in a non-selected state, and are used to represent that the user does not select the picture 1412C and the picture 1412F.

The picture function option 1413 may include one or more function options, for example, may include a sharing function option 1413A, a deleting function option 1413B, a select-all function option 1413C, a moving object elimination function option 1413D, and a more function option 1413E.

The electronic device may detect a touch operation (for example, a tap operation) performed on the moving object elimination function option 1413D. The electronic device determines, in response to the touch operation, that the user selects the picture 1412A, the picture 1412B, the picture 1412D, and the picture 1412E. Then, the electronic device may obtain a similarity between any two of the four pictures. For descriptions of obtaining the similarity, refer to the descriptions of the foregoing grouping process. Details are not described herein again. Assuming that the similarity between the any two pictures is greater than or equal to a first threshold, the electronic device determines that the four pictures constitute an image group (that is, a first group). The electronic device may eliminate a moving object based on the first group, to obtain a target image in which the moving object is eliminated. For an example process, refer to the embodiment shown in FIG. 7. Details are not described herein again. In other words, the user may manually select a plurality of to-be-processed pictures (that is, the first group), and trigger a function of eliminating a moving object by tapping the moving object elimination function option 1413D. After obtaining the target image, the electronic device may display the user interface 142 shown in FIG. 14(B).

As shown in FIG. 14(B), the user interface 142 may include a picture list 1421 and a prompt box 1422. The prompt box 1422 may include prompt information and a region 1422A. The region 1422A may be used to display a thumbnail of a target image in which a moving object is eliminated. The prompt box 1422 may include text information: A picture obtained by performing "moving object elimination" is stored in "all pictures". As can be learned from the text information in the prompt box 1422, the electronic device stores the target image in the gallery application, and the target image belongs to the classification of all pictures 122B. The picture list 1421 may include a region 1421A and a picture in the picture list 1412 shown in FIG. 14(A). The region 1421A is used to display a thumbnail of a target image in which a moving object is eliminated. An area of the target image displayed in the region 1421A may be different from an area of the target image displayed in the region 1422A.

It may be understood that, the electronic device may detect a touch operation (for example, a tap operation) performed on the control 1411A, and the electronic device may cancel display of the selection box 1412A-1, the selection box 1412B-1, the selection box 1412C-1, the selection box 1412D-1, the selection box 1412E-1, the selection box 1412F-1, and the picture function option 1413 in response to the touch operation. In addition, the electronic device may change, in response to the touch operation, the text information 1411B to all pictures. In this case, the user interface displayed by the electronic device may be a user interface displayed by the electronic device in response to a tap operation after the user taps the classification of all pictures 122B in the user interface 120 shown in FIG. 12.

It may be understood that, if a plurality of pictures selected by the user do not meet a requirement, for example, there are two pictures whose similarity is less than the first threshold, the electronic device cannot eliminate a moving object based on the plurality of pictures selected by the user. In this case, the electronic device may prompt the user to reselect a picture. For an example, refer to the embodiment shown in FIG. 15(A) and FIG. 15(B).

Figure 15A:
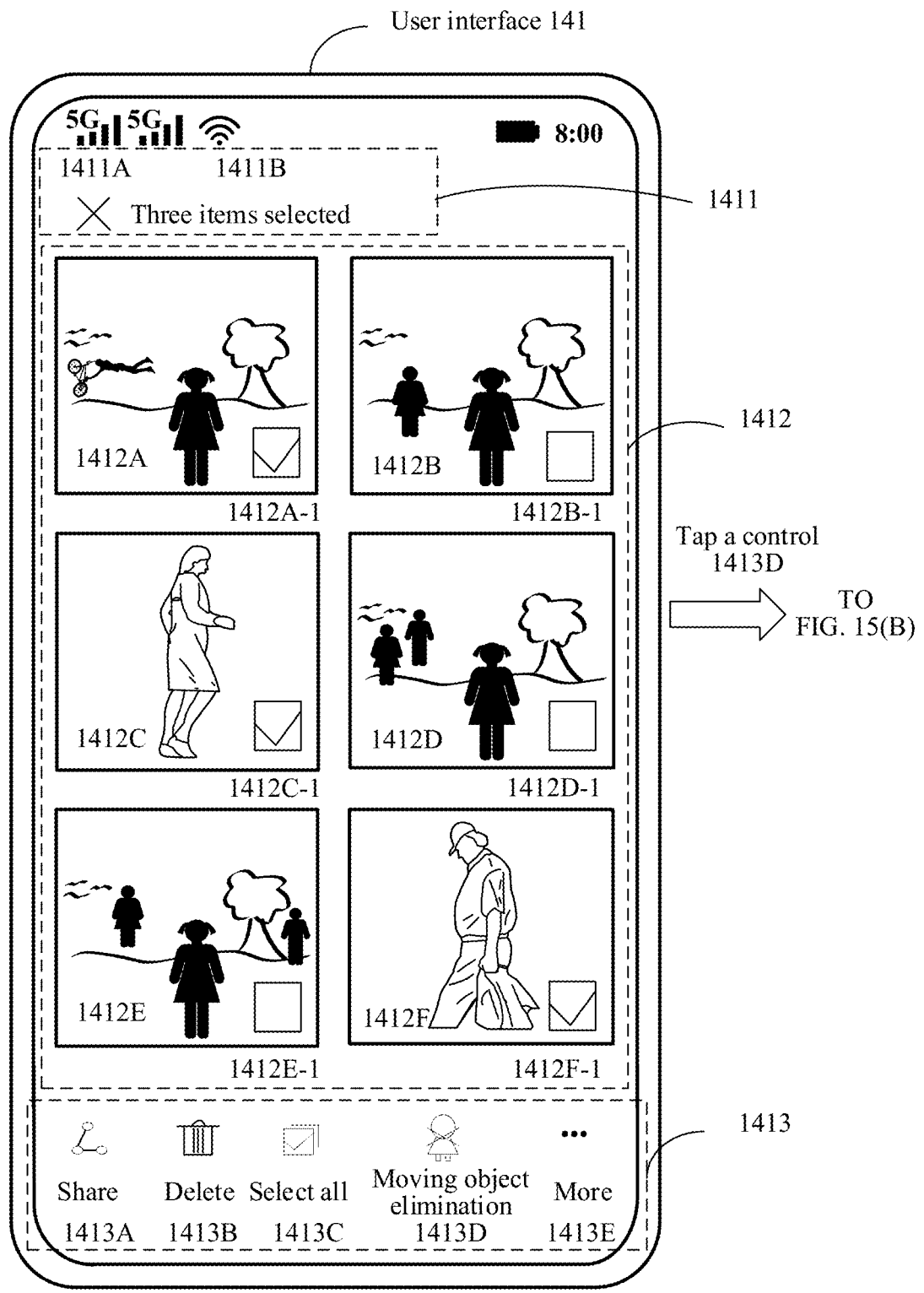
Figure 15B:
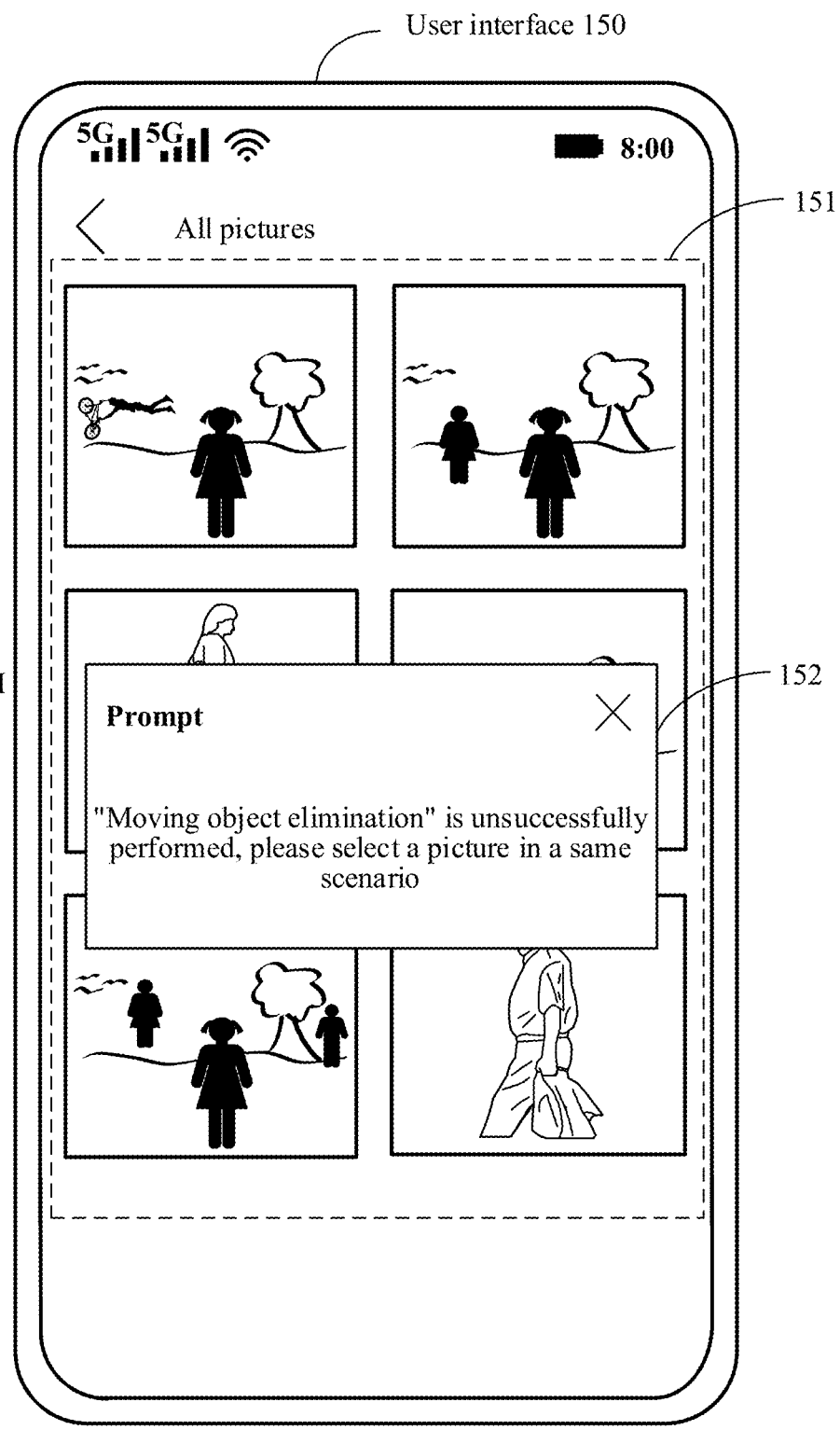

Refer to FIG. 15(A) and FIG. 15(B). FIG. 15(A) and FIG. 15(B) is another schematic diagram of an example of human-computer interaction. A user interface 141 shown in FIG. 15(A) is a user interface on which a plurality of pictures are selected before the user taps a control 1413D, and a user interface 150 shown in FIG. 15(B) is a user interface after the user taps the control 1413D.

As shown in FIG. 15(A), the user interface 141 is similar to the user interface 141 shown in FIG. 14(A), except that the picture selected by the user is changed to the picture 1412A, the picture 1412C, and the picture 1412F, and the text information 1411B is also correspondingly changed to "Three items selected".

The electronic device may detect a touch operation (for example, a tap operation) performed on the moving object elimination function option 1413D. The electronic device determines, in response to the touch operation, that the user selects the picture 1412A, the picture 1412C, and the picture 1412F. Then, the electronic device may obtain a similarity between any two of the three pictures. For descriptions of obtaining the similarity, refer to the descriptions of the foregoing grouping process. Details are not described herein again. Assuming that the similarity between the any two pictures is less than the first threshold, the electronic device determines that the three pictures cannot be used as one first group for processing. In this case, the electronic device displays the user interface 150 shown in FIG. 15(B).

As shown in FIG. 15(B), the user interface 150 may include a picture list 151 and a prompt box 152. The picture list 151 may include pictures in the picture list 1412 shown in FIG. 15(A). The prompt box 152 may include text information: "Moving object elimination" fails. Please select a picture in a same scenario.

In some embodiments, the electronic device may also receive a user operation. The user operation is used to select one image and trigger a function of eliminating a moving object. The electronic device may identify, in response to the user operation, the image selected by the user as a first image, obtain a first group including the first image, and eliminate a moving object based on the first group. In other words, the electronic device may eliminate a moving object based on the first image manually selected by the user. An example is shown in FIG. 16(A) and FIG. 16(B).

Figure 16A:
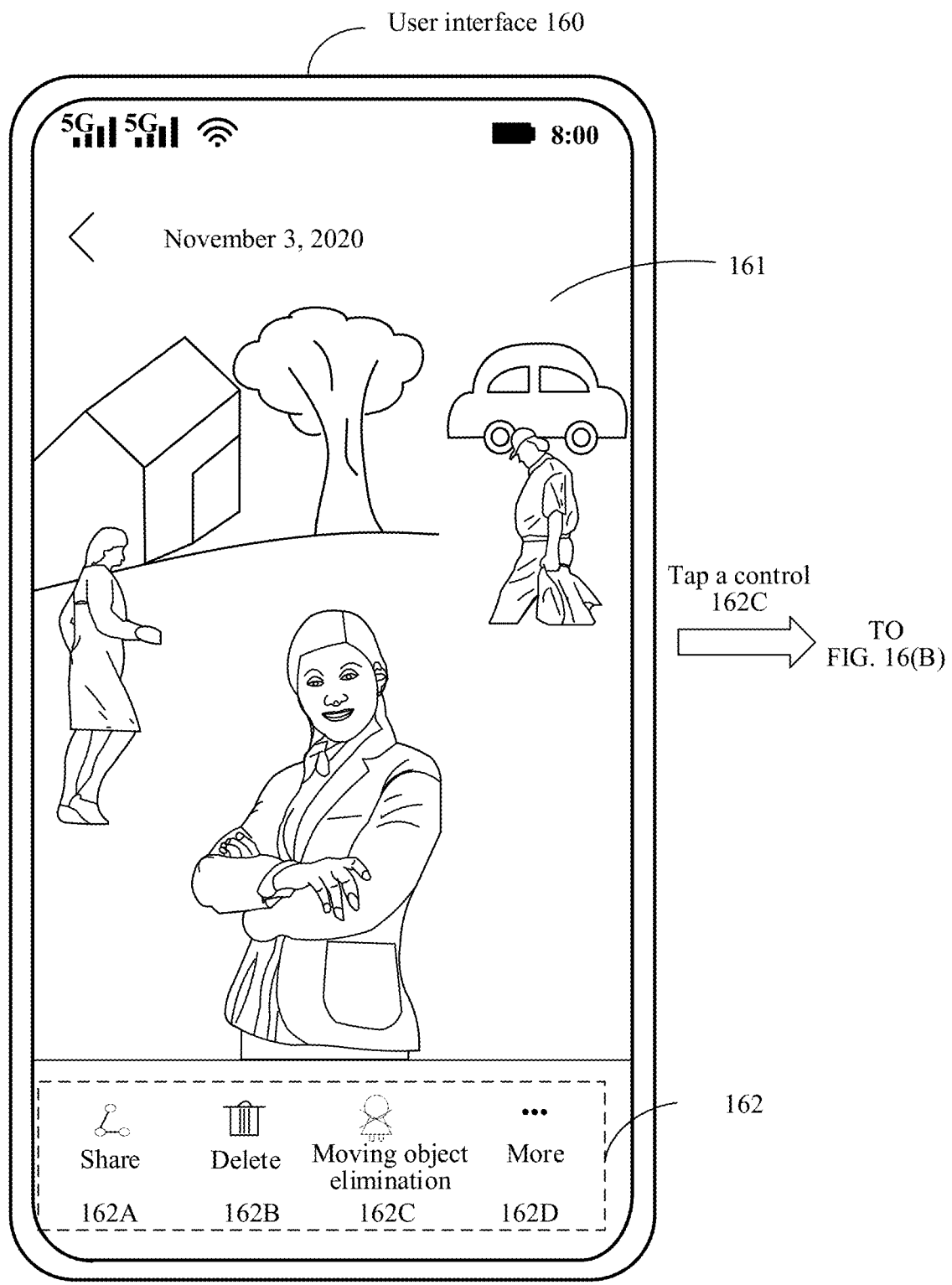
Figure 16B:
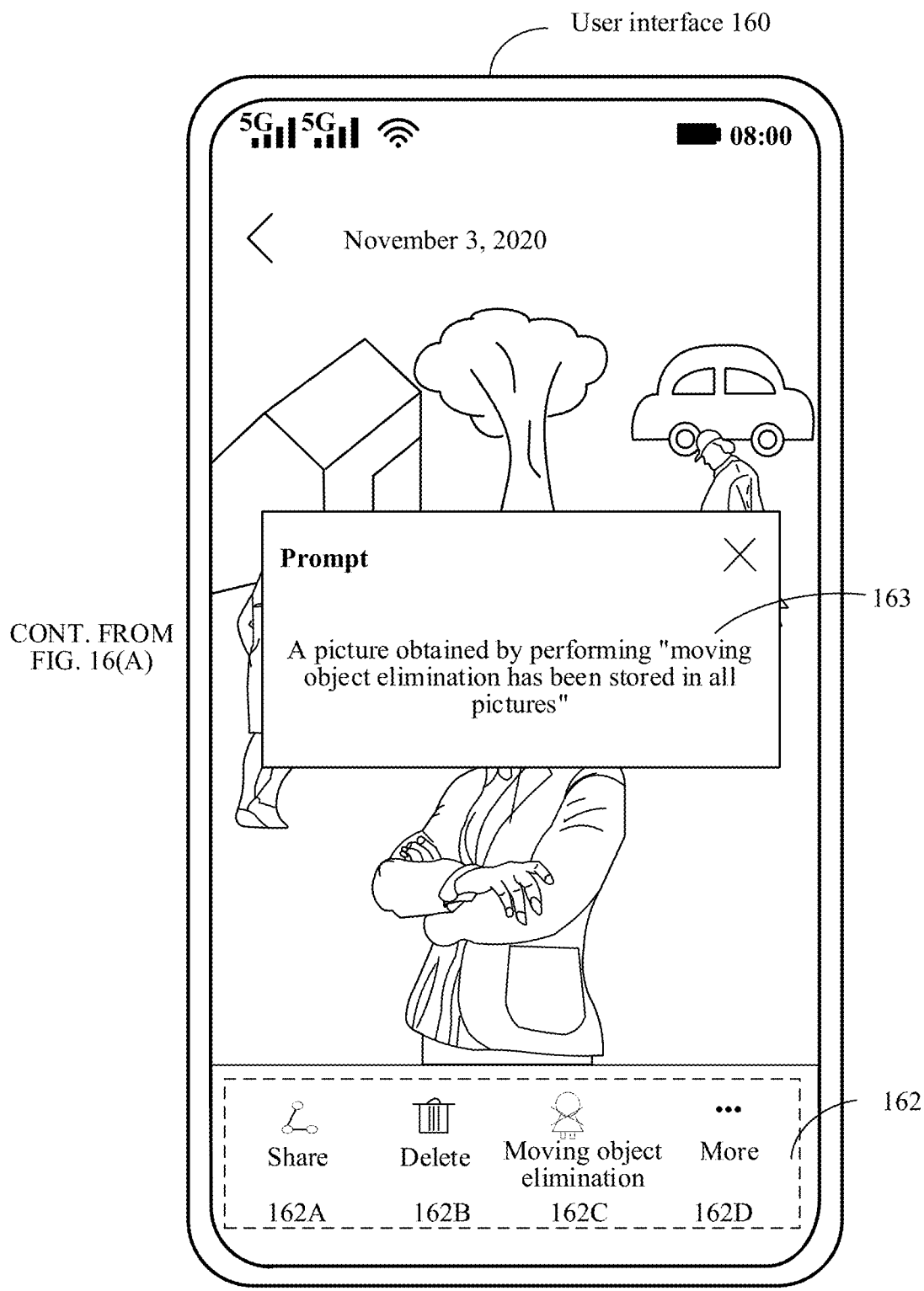

Refer to FIG. 16(A) and FIG. 16(B). FIG. 16(A) and FIG. 16(B) is another schematic diagram of an example of human-computer interaction. A user interface 160 shown FIG. 16(A) is a user interface before the user taps a control 162C, and a user interface 160 shown in FIG. 16(B) is a user interface after the user taps the control 162C.

As shown in FIG. 16(A), the user interface 160 may include a picture 161 and a picture function option 162. The electronic device may detect a touch operation (for example, a tap operation) performed on a thumbnail of the picture 161, and the electronic device may display, in response to the touch operation, the user interface 160 shown in FIG. 16(A). The thumbnail of the picture 161 may be displayed in the control 305 shown in FIG. 3. This application is not limited thereto. The thumbnail of the picture 161 may also be displayed in any picture list, for example, in the picture list 151 shown in FIG. 15(B).

The picture function option 162 may include one or more function options for the picture 161, for example, may include a sharing function option 162A, a deleting function option 162B, a moving object elimination function option 162C, and a more function option 162D.

The electronic device may detect a touch operation (for example, a tap operation) performed on the moving object elimination function option 162C, and the electronic device may identify the picture 161 as a first image in response to the touch operation. Then, the electronic device may obtain a plurality of pictures whose similarity to the picture 161 is greater than or equal to the first threshold. The picture 161 and the obtained plurality of pictures are identified as one first group. For a manner of calculating a similarity, refer to the description of the foregoing grouping process. Details are not described herein again. The electronic device may eliminate a moving object based on the first group, to obtain a target image in which the moving object is eliminated. For an example process, refer to the embodiment shown in FIG. 7. Details are not described herein again. After obtaining the target image, the electronic device may display the user interface 160 shown in FIG. 16(B). In other words, the user may trigger a function of eliminating a moving object by tapping the moving object elimination function option 162C.

Compared with the user interface 160 shown in FIG. 16(A), the user interface 160 shown in FIG. 16(B) further includes a prompt box 163. The prompt box 163 may include text information: A picture obtained by performing "moving object elimination" has been stored in "all pictures". As can be learned from the text information in the prompt box 163, the electronic device stores the target image in the gallery application, and the target image belongs to the classification of all pictures 122B. The user may tap the classification of all pictures 122B in the user interface 120 shown in FIG. 12 to view the target image. In other words, the user may manually select the first image, and trigger the function of eliminating a moving object.

It may be understood that, if the electronic device cannot obtain a picture whose similarity to the picture 161 is greater than or equal to the first threshold, the electronic device determines that the picture 161 cannot be used as the first image for eliminating a moving object. In this case, the electronic device may prompt the user to reselect a picture. An example is similar to the embodiment shown in FIG. 15(A) and FIG. 15(B). Details are not described herein again.

This application is not limited to the example shown in FIG. 16(A) and FIG. 16(B). In some embodiments, the user may also select a picture from the user interfaces 141 shown in FIG. 14(A) and FIG. 15(A), and then tap the moving object elimination function option 1413D. The electronic device may identify, in response to the tap operation, the picture selected by the user as the first image, and eliminate a moving object based on the first image. This is not limited in embodiments of this application.

In some embodiments, the electronic device may also receive a user operation on an image. The user operation is used to select a photographed subject to be retained in the image, and trigger the function of eliminating a moving object. The electronic device may obtain, in response to the user operation, a first group including the image, and identify the image as a first image of the first group. Then, the electronic device may eliminate a moving object based on the first group, the first image, and the photographed subject selected by the user. In other words, the electronic device may eliminate a moving object based on the photographed subject manually selected by the user. An example is shown in FIG. 17(A) and FIG. 17(B).

Figure 17A:
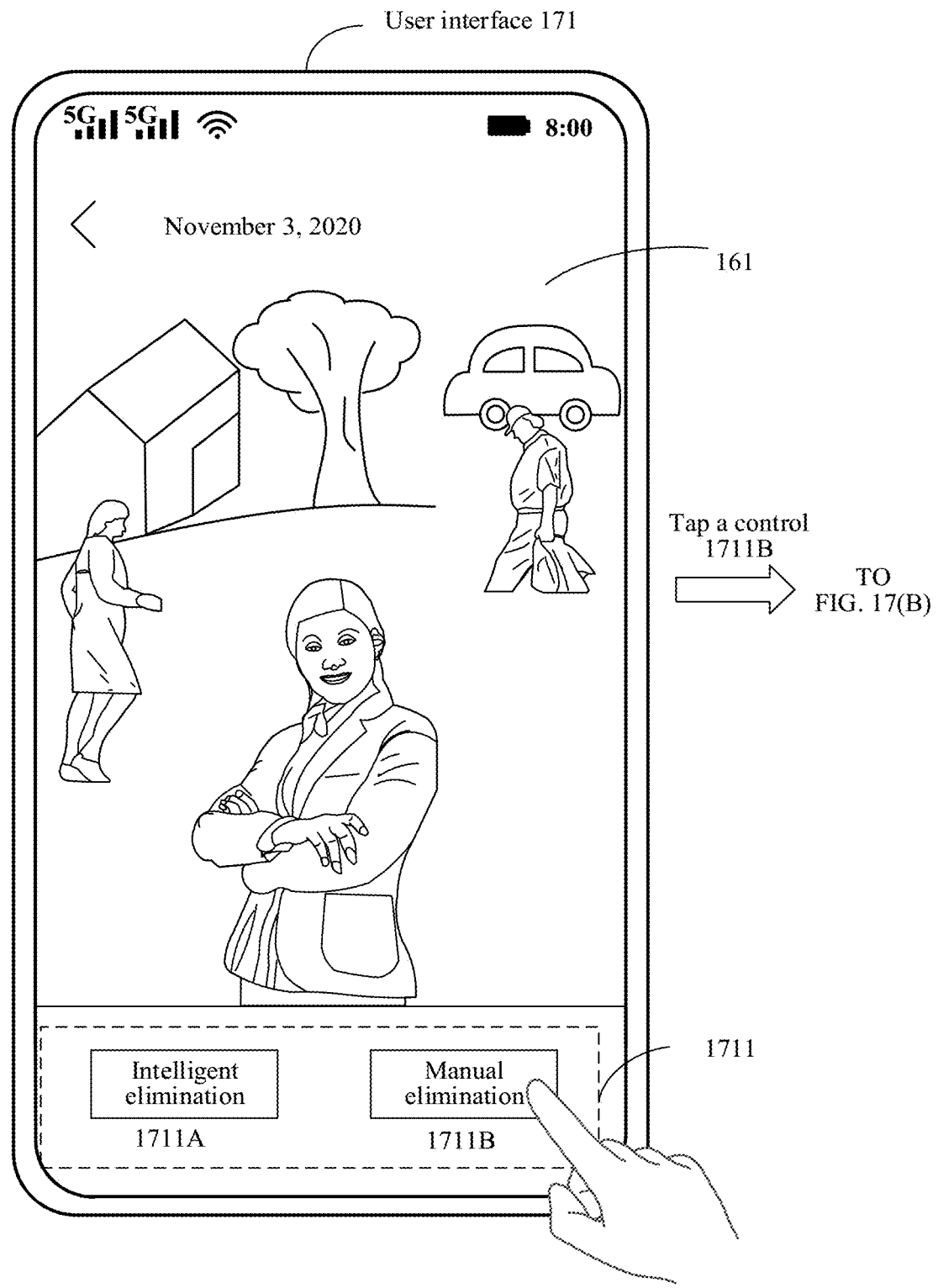
Figure 17B:
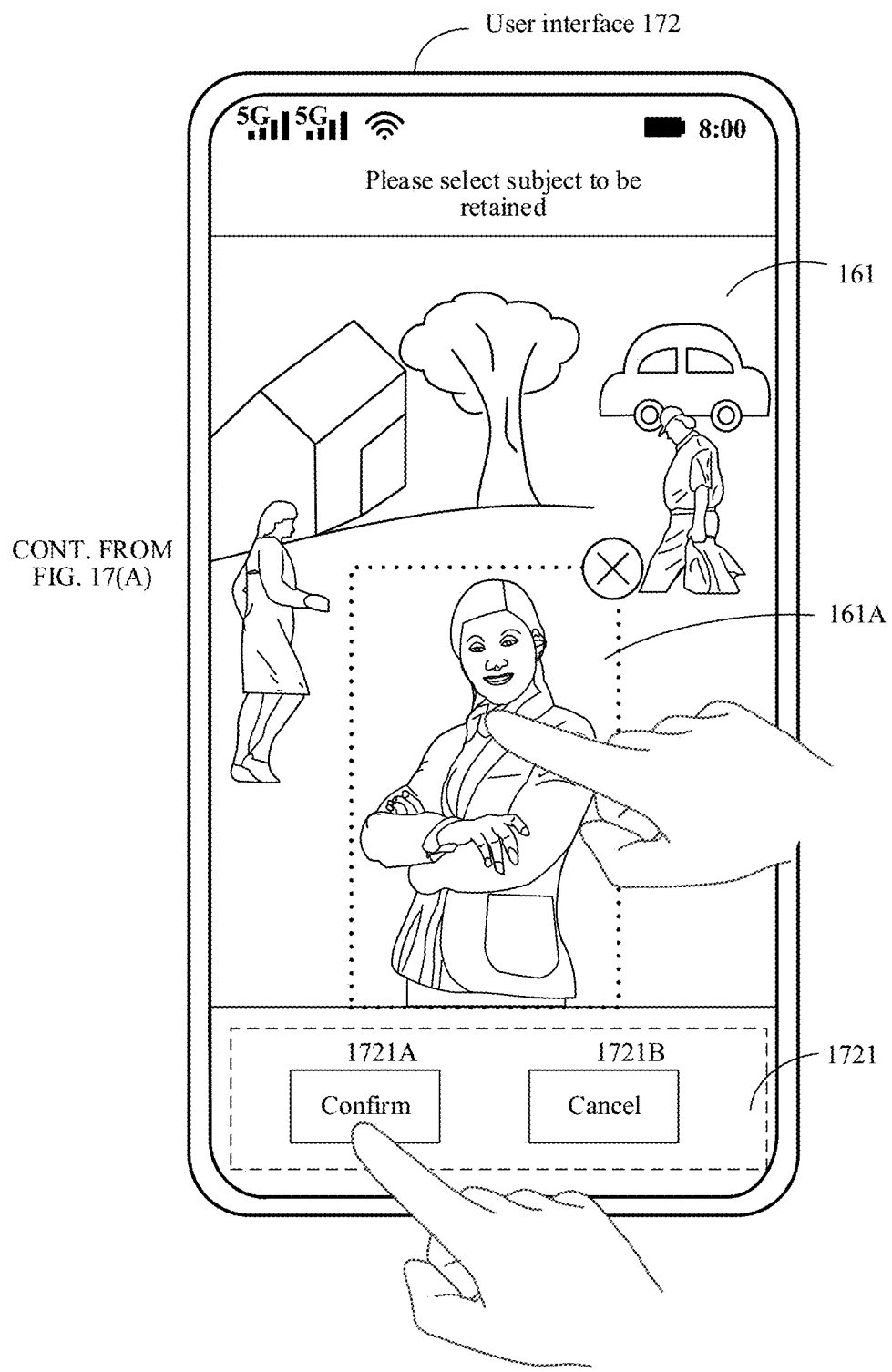

Refer to FIG. 17(A) and FIG. 17(B). FIG. 17(A) and FIG. 17(B) is another schematic diagram of an example of human-computer interaction. A user interface 171 shown in FIG. 17(A) is a user interface before the user taps a control 1711B, and a user interface 172 shown in FIG. 17(B) is a user interface after the user taps the control 1711B.

As shown in FIG. 17(A), the user interface 171 may include a picture 161 and an elimination function option 1711. The electronic device may detect a touch operation (for example, a tap operation) performed on the moving object elimination function option 162C in the user interface 160 shown in FIG. 16(A), and the electronic device may display, in response to the touch operation, the user interface 171 shown in FIG. 17(A).

The elimination function option 1711 may include an intelligent elimination function option 1711A and a manual elimination function option 1711B. The electronic device may detect a touch operation (for example, a tap operation) performed on the intelligent elimination function option 1711A, and the electronic device may identify the picture 161 as a first image in response to the touch operation. Then, the electronic device may obtain a plurality of pictures whose similarity to the picture 161 is greater than or equal to the first threshold. The picture 161 and the obtained plurality of pictures are identified as one first group. For a manner of calculating a similarity, refer to the description of the foregoing grouping process. Details are not described herein again. Then, the electronic device may eliminate a moving object based on the first group, to obtain a target image in which the moving object is eliminated. For an example process, refer to the embodiment shown in FIG. 7. Details are not described herein again. After obtaining the target image, the electronic device may display the user interface 160 shown in FIG. 16(B). In other words, the user may trigger a function of eliminating a moving object by tapping the intelligent elimination function option 1711A.

The electronic device may also detect a touch operation (for example, a tap operation) performed on the manual elimination function option 1711B, and the electronic device may display, in response to the touch operation, the user interface 172 shown in FIG. 17(B). The user interface 172 may include a picture 161 and a function option 1721.

The electronic device may detect a touch operation (for example, a tap operation) performed on any object in the picture 161, and the electronic device may determine, in response to the touch operation, the object as a photographed subject currently selected by the user. In the user interface 172 shown in FIG. 17(B), the user has selected a person object in the region 161A.

The function option 1721 may include a determining option 1721A and a canceling option 1721B. When the user has selected an object, the electronic device may detect a touch operation (for example, a tap operation) performed on the determining option 1721A, and the electronic device may obtain a plurality of pictures whose similarity to the picture 161 is greater than or equal to the first threshold. The picture 161 and the obtained plurality of pictures are identified as one first group. For a manner of calculating a similarity, refer to the description of the foregoing grouping process. Details are not described herein again. Then, the electronic device may identify the picture 161 as a first image in the first group, identify the object selected by the user as a photographed subject in the first group, and eliminate a moving object based on the first group. For details of the eliminating process, refer to the embodiment shown in FIG. 7. Details are not described herein again. Finally, the electronic device may obtain a target image in which the moving object is eliminated. In this case, the user interface 160 shown in FIG. 16(B) may be displayed. In other words, the user may manually select the photographed subject, and trigger the function of eliminating a moving object through the determining option 1721A.

It should be noted that, if the user does not select an object, unction of eliminating a moving object may not be triggered even if the user taps the determining option 1721A.

In some embodiments, the electronic device may detect a touch operation (for example, a tap operation) performed on the canceling option 1721B, and the electronic device may display, in response to the touch operation, the user interface 171 shown in FIG. 17(A) or the user interface 160 shown in FIG. 16(A).

In some embodiments, the electronic device may also receive a user operation on an image. The user operation is used to select a moving object to be eliminated from the image, and trigger the function of eliminating a moving object. The electronic device may obtain, in response to the user operation, a first group including the image, and identify the image as a first image of the first group. Then, the electronic device may eliminate a moving object based on the first group, the first image, and the moving object selected by the user. In other words, the electronic device may eliminate the moving object manually selected by the user. An example is shown in FIG. 18.

Figure 18:
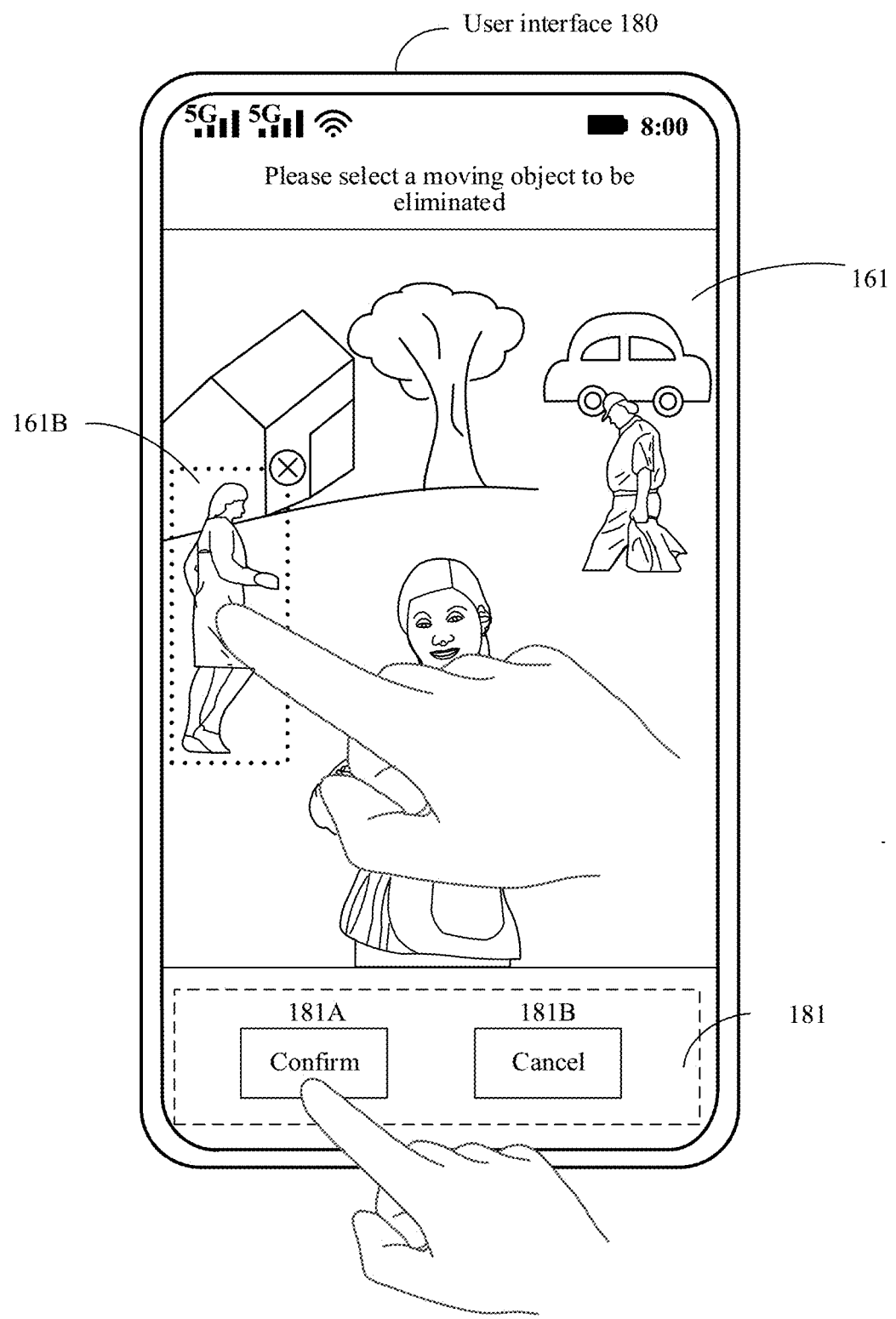

Refer to FIG. 18. FIG. 18 shows an example of a user interface 180 of a gallery application on an electronic device such as a smartphone. The electronic device may detect a touch operation (for example, a tap operation) performed on the manual elimination function option 1711B in the user interface 171 shown in FIG. 17(A), and the electronic device may display, in response to the touch operation, the user interface 180 shown in FIG. 18.

As shown in FIG. 18, the user interface 180 may include a picture 161 and a function option 181. the electronic device may detect a touch operation (for example, a tap operation) performed on any object in the picture 161, and the electronic device may determine, in response to the touch operation, the object as a to-be-eliminated moving object currently selected by the user. In the user interface 180 shown in FIG. 18, the user has selected a person object in a region 161B.

The function option 181 may include a determining option 181A and a canceling option 181B. When the user has selected an object, the electronic device may detect a touch operation (for example, a tap operation) performed on the determining option 181A. Then, the electronic device may obtain, in response to the touch operation, a plurality of pictures whose similarity to the picture 161 is greater than or equal to the first threshold. The picture 161 and the obtained plurality of pictures are identified as one first group. For a manner of calculating a similarity, refer to the description of the foregoing grouping process. Details are not described herein again. Then, the electronic device may identify the picture 161 as a first image in the first group, identify the object selected by the user as a to-be-eliminated moving object in the first group, and eliminate a moving object based on the first group. For details of the eliminating process, refer to the embodiment shown in FIG. 7. Details are not described herein again. Finally, the electronic device obtains a target image in which the moving object is eliminated. In this case, the user interface 160 shown in FIG. 16(B) may be displayed. In other words, the user may manually select the to-be-eliminated moving object, and trigger the function of eliminating a moving object through the determining option 181A.

It should be noted that, if the user does not select an object, unction of eliminating a moving object may not be triggered even if the user taps the determining option 181A.

In some embodiments, the electronic device may detect a touch operation (for example, a tap operation) performed on the canceling option 181B, and the electronic device may display, in response to the touch operation, the user interface 171 shown in FIG. 17(A) or the user interface 160 shown in FIG. 16(A).

In some embodiments, after determining a first group and before determining that an object selected by the user is a moving object that is to be eliminated from the first group, the electronic device may first obtain a distance between objects selected by the user in any two images in the first group. Only when the distance is greater than or equal to a fifth preset threshold, the electronic device determines that the object selected by the user is the moving object that is to be eliminated from the first group, and eliminates the moving object based on the first group. When there is a distance less than the fifth preset threshold, the electronic device determines that the object selected by the user cannot be used as a first object for eliminating the moving object. In this case, the electronic device may prompt the user to reselect a moving object. An example is similar to the embodiment shown in FIG. 15(A) and FIG. 15(B). Details are not described herein again. For an example process of determining whether the object selected by the user is a first object, refer to the description of S704 in FIG. 7. Details are not described herein again.

This application is not limited to the foregoing example. In some embodiments, the user may select both the photographed subject and the moving object. For example, after selecting the photographed subject, the user may tap the determining option 1721A in the user interface 172 shown in FIG. 17(B). The electronic device may display the user interface 180 in FIG. 18 in response to the tap operation. After selecting the moving object in the user interface 180, the user may tap the determining option 181A in the user interface 180. In response to the tap operation, the electronic device may perform moving object elimination based on the photographed subject and the moving object that are selected by the user. This is not limited in embodiments of this application.

It may be understood that, in the embodiments shown in FIG. 12, FIG. 13A and FIG. 13B, and FIG. 14(A) and FIG. 14(B) to FIG. 18, for descriptions of obtaining a first group, refer to the descriptions of the foregoing grouping process. For descriptions of determining a photographed subject, determining a moving object, and determining a first image, refer to the foregoing procedure shown in FIG. 7. Details are not described herein again.

Based on some embodiments shown in FIG. 1 to FIG. 9, FIG. 10A to FIG. 10D, FIG. 11 and FIG. 12, FIG. 13A and FIG. 13B, and FIG. 14(A) and FIG. 14(B) to FIG. 18, the following describes an image processing method provided in this application.

Figure 19:
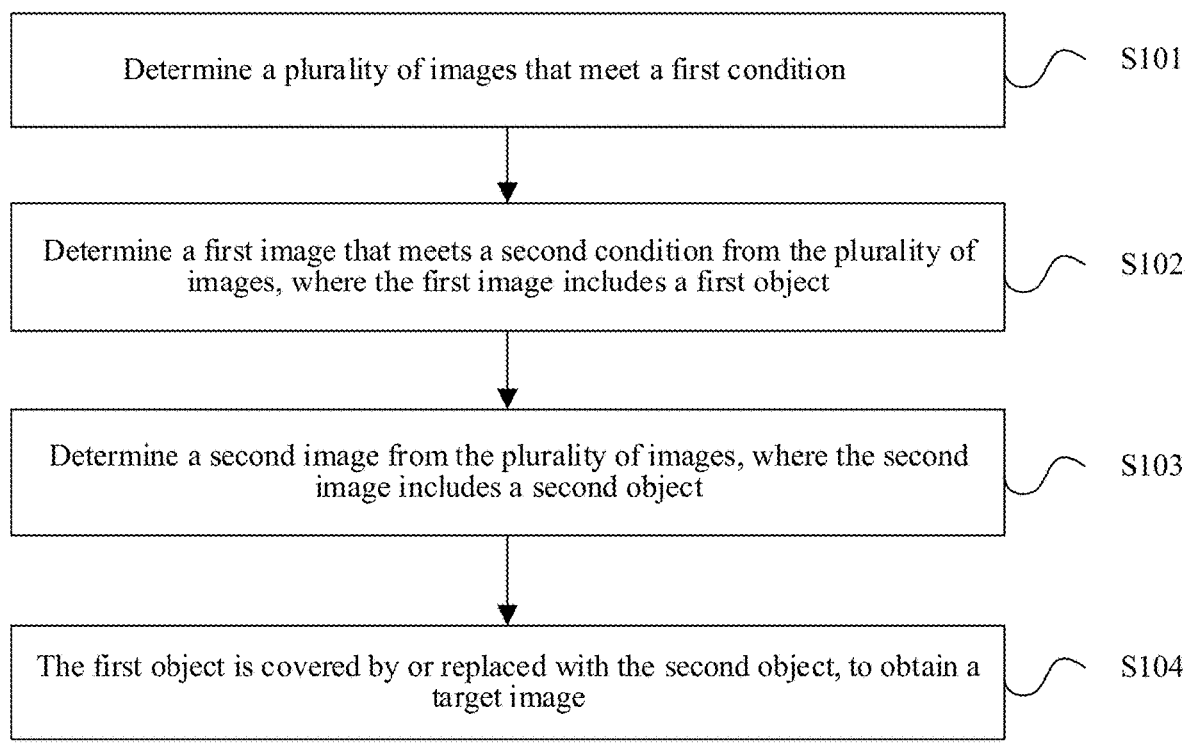
FIG. 19 is a schematic flowchart of another image processing method according to an embodiment of this application.

Refer to FIG. 19. FIG. 19 shows an image processing method according to an embodiment of this application. The method may be applied to the electronic device shown in FIG. 1. The method may be further applied to the electronic device shown in FIG. 2. The method includes but is not limited to the following operations.

S101: The electronic device determines a plurality of images that meet a first condition.

Specifically, the first condition may include that a similarity between any two images in a plurality of images is greater than or equal to a first threshold, and the plurality of images may be referred to as a first group. In some embodiments, the first condition may further include at least one of the following: a first operation is received, a photographing time of any one of the plurality of images is within a first range, and a photographing location of any one of the plurality of images is within a second range, where the first operation is used to select the plurality of images. For an example of determining a plurality of images by performing the first operation, refer to the embodiments shown in FIG. 14(A) and FIG. 14(B) and FIG. 15(A) and FIG. 15(B). Details are not described herein again. For a manner of calculating a similarity, and a description of determining a plurality of images (that is, a first group) that meet a first condition, refer to the description of the foregoing grouping process. Details are not described herein again.

The plurality of images determined by the electronic device may be obtained by the electronic device in a default photographing mode, so that embodiments of this application can be implemented in a general scenario, and application is more widely.

S102: The electronic device determines, from the plurality of images, a first image that meets a second condition, where the first image includes a first object.

Specifically, the first object is a to-be-eliminated moving object in the first image. The second condition includes at least one of the following: a definition of a photographed subject in the first image is greater than or equal to a second threshold, and a quantity of other objects than the photographed subject in the first image is less than a third threshold. The electronic device may process and determine each image in the first group, to obtain the first image that meets the second condition in the first group. For details, refer to the description of S703 in FIG. 7. Details are not described herein again.

In some embodiments, the second condition may further include that a user operation performed to select the first image is received. For an example of determining the first image by performing the user operation, refer to the embodiment shown in FIG. 16(A) and FIG. 16(B). Details are not described herein again.

In some embodiments, before S102, the electronic device may first perform semantic segmentation on each of the plurality of images (that is, the first group), to identify an object (for example, a person, a building, or a car) included in the image. For details, refer to the description of S701 in FIG. 7 and the embodiment shown in FIG. 8.

In some embodiments, before S102, the method further includes: The electronic device determines, from the plurality of images (that is, the first group), a photographed subject that meets a third condition. The third condition includes at least one of the following: a second operation is received, a definition of a photographed subject in any image in the first group is greater than or equal to a fourth threshold, a focus point of any image in the first group is in a region in which the photographed subject is located, an area of the photographed subject in any image in the first group is greater than or equal to a fifth threshold, and the photographed subject belongs to a preset category, where the second operation is used to select the photographed subject. The electronic device may process and determine each object in the first group, to obtain the photographed subject that meets the third condition in the first group. For details, refer to the description of S702 in FIG. 7. Details are not described herein again. For an example of determining the photographed subject by performing the second operation, refer to the embodiment shown in FIG. 17(A) and FIG. 17(B). Details are not described herein again.

In some embodiments, after the first image is determined, the electronic device may determine the first object in the first group. The electronic device may first configure images in the first group in a same coordinate system (that is, coordinate registration in S704 in FIG. 7), and then obtain, based on the coordinate system, a distance between objects in any two images in the first group. When the distance is greater than or equal to a fifth preset threshold, the electronic device may determine the object as the first object. For details, refer to the description of S704 in FIG. 7. Details are not described herein again.

S103: The electronic device determines a second image from the plurality of images, where the second image includes a second object.

Specifically, the second image may be at least one image in the plurality of images except the first image. For example, the second image is an image that is most similar to the first image in the plurality of images, or the second image is at least one image that is in the plurality of images and whose similarity to the first image is greater than a preset threshold. The second object may be obtained based on one second image, or may be obtained by splicing at least one second image.

A position of the second object in the second image corresponds to a position of the first object in the first image. In other words, when the first image and the second image are in a same first coordinate system, the position of the second object in the second image is the same as the position of the first object in the first image. The first coordinate system is a coordinate system obtained after the electronic device performs coordinate registration, for example, the standard coordinate system shown in S704 in FIG. 7. For an example in which the electronic device determines the second object, and the second image including the second object, refer to the embodiments shown in FIG. 9 and FIG. 10A to FIG. 10D. Details are not described herein again.

S104: The electronic device covers or replaces the first object with the second object, to obtain a target image.

Specifically, for an example in which the electronic device covers or replaces the first object with the second object, refer to the description of S705 in FIG. 7 and the embodiments shown in FIG. 9, FIG. 10A to FIG. 10D, and FIG. 11. For an example of the obtained target image, refer to the image 1100 shown in (C) in FIG. 11. Compared with the first image, a moving object is eliminated from the target image, and real image content, real image content is displayed in a region in which the moving object is eliminated, so that user experience is better.

It may be understood that, the process shown in FIG. 19 may be performed by the electronic device in a background, and the user does not sense the process. After obtaining the target image, the electronic device may recommend the target image to the user, and the user does not need to manually trigger the function of eliminating a moving object. For examples, refer to the embodiments shown in FIG. 13A and FIG. 13B.

In the method shown in FIG. 19, the electronic device may determine to obtain a first group in a same photographing scenario. An image in the first group may be an image obtained by the electronic device in a default photographing mode. The electronic device may eliminate a moving object (that is, a first object) based on the first group. Therefore, the user does not need to eliminate a moving object in a photographing mode, which is more convenient to use and has a wider application scenario. In addition, the image content used to fill or cover a moving object is obtained based on a real second image, so that a display effect is better and user experience is better.

In addition, the electronic device can eliminate the moving object without being sensed by the user and recommend the obtained target image to the user for viewing, so that there is no need for the user to manually trigger an elimination function, thereby being more convenient in use. In some embodiments, the user may manually select the first group, the first image, the photographed subject, or the moving object, which has higher flexibility.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or some of the procedures or functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, another computer, another server, or another data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk)), or the like.

In conclusion, the foregoing descriptions are merely embodiments of the technical solutions of the present disclosure, but are not intended to limit the protection scope of the present disclosure. Any modification, equivalent replacement, or improvement made according to the present disclosure shall fall within the protection scope of the present disclosure.

It is clearly that, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. An electronic device, wherein the electronic device comprises at least one memory and at least one processor, the at least one memory is coupled to the at least one processor, the at least one memory is configured to store a computer program, the at least one processor is configured to invoke the computer program, the computer program comprises instructions, and when the instructions are executed by the at least one processor, the electronic device is enabled to perform:
  determining a plurality of images that meet a first condition, wherein the first condition comprises that a similarity between any two images in the plurality of images is greater than or equal to a first threshold;
  determining, from the plurality of images, a first image that meets a second condition, wherein the first image comprises a photographed subject and a first object, and the first object is a to-be-eliminated object in the first image;
  determining a second image from the plurality of images, wherein the second image comprises a second object, and a position of the second object in the second image corresponds to a position of the first object in the first image; and
  covering or replacing the first object with the second object, to obtain a target image,
  wherein the determining the first image that meets the second condition comprises:
    determining a first distance between the photographed subject and a third object, wherein the third object comprises an object included in the first image other than the photographed subject; and
    determining the third object as the first object when the first distance is greater than a preset threshold.

2. The electronic device according to claim 1, wherein the first condition further comprises at least one of the following: a photographing time of any one of the plurality of images is within a first range, or a photographing location of any one of the plurality of images is within a second range.

3. The electronic device according to claim 1, wherein the electronic device is further enabled to perform:
  receiving a first operation, wherein the first operation is used to select the plurality of images.

4. The electronic device according to claim 1, wherein the electronic device is further enabled to perform:
  performing semantic segmentation on the plurality of images to identify one or multiple objects included in the plurality of images.

5. The electronic device according to claim 4, wherein the electronic device is further enabled to perform:
  determining, from the one or multiple objects, the photographed subject that meets a third condition, wherein the third condition comprises at least one of the following: a definition of the photographed subject in any one of the plurality of images is greater than or equal to a fifth threshold, a focus point of any one of the plurality of images is located in a region of the photographed subject, an area of the photographed subject in any one of the plurality of images is greater than or equal to a sixth threshold, the photographed subject belongs to a preset category, or a third operation is received, wherein the third operation is used to select the photographed subject.

6. The electronic device according to claim 5, wherein the second condition comprises at least one of the following: a definition of the photographed subject in the first image is greater than or equal to a second threshold, a quantity of other objects than the photographed subject in the first image is less than a third threshold, or a second operation is received, wherein the second operation is used to select the first image.

7. The electronic device according to claim 1, wherein the second image is any image other than the first image in the plurality of images, and a similarity between the second image and the first image is greater than or equal to a fourth threshold.

8. The electronic device according to claim 1, wherein the electronic device is further enabled to perform:
  receiving a fourth operation, wherein the fourth operation is used to select the first object.

9. The electronic device according to claim 1, wherein the electronic device is further enabled to perform:
  determining a central point of a third object in the first image, a central point of a fourth object in the first image, a central point of a fifth object in a third image, and a central point of a sixth object in the third image, wherein the third image is any image other than the first image in the plurality of images, the third object and the fifth object have a same attribute, and the fourth object and the sixth object have a same attribute;
  placing the central point of the third object and the central point of the fifth object in a same coordinate system with a same coordinate origin, and establishing a first coordinate system based on the coordinate origin;
  determining a first distance between the central point of the fourth object and the central point of the sixth object based on the first coordinate system; and
  determining the fourth object as the first object when the first distance is greater than or equal to a seventh threshold.

10. The electronic device according to claim 9, wherein objects represented by the third object and the fifth object are at a same location at any time point.

11. The electronic device according to claim 1, wherein the electronic device is further enabled to perform:
  receiving a fifth operation; and
  displaying a first interface in response to the fifth operation, wherein the plurality of images and the target image are displayed in the first interface.

12. The electronic device according to claim 1, wherein the electronic device is further enabled to perform:
  determining the third object as the first object when the third object does not exist in the plurality of images other than the first image.

13. An image processing method, applied to an electronic device, the method comprising:
  determining a plurality of images that meet a first condition, wherein the first condition comprises that a similarity between any two images in the plurality of images is greater than or equal to a first threshold;
  determining, from the plurality of images, a first image that meets a second condition, wherein the first image comprises a photographed subject and a first object, and the first object is a to-be-eliminated object in the first image;
  determining a second image from the plurality of images, wherein the second image comprises a second object, and a position of the second object in the second image corresponds to a position of the first object in the first image; and
  covering or replacing the first object with the second object, to obtain a target image,
  wherein the determining the first image that meets the second condition comprises:
    determining a first distance between the photographed subject and a third object, wherein the third object comprises an object included in the first image other than the photographed subject; and determining the third object as the first object when the first distance is greater than a preset threshold.

14. The method according to claim 13, further comprising:
performing semantic segmentation on the plurality of images to identify one or multiple objects included in the plurality of images.

15. The method according to claim 14, further comprising:
determining, from the one or multiple objects, the photographed subject that meets a third condition, wherein the third condition comprises at least one of the following: a definition of the photographed subject in any one of the plurality of images is greater than or equal to a fifth threshold, a focus point of any one of the plurality of images is located in a region of the photographed subject, an area of the photographed subject in any one of the plurality of images is greater than or equal to a sixth threshold, the photographed subject belongs to a preset category, or a third operation is received, wherein the third operation is used to select the photographed subject.

16. The method according to claim 15, wherein the second condition comprises at least one of the following: a definition of the photographed subject in the first image is greater than or equal to a second threshold, a quantity of other objects than the photographed subject in the first image is less than a third threshold, or a second operation is received, wherein the second operation is used to select the first image.

17. The method according to claim 13, further comprising:
determining a central point of a third object in the first image, a central point of a fourth object in the first image, a central point of a fifth object in a third image, and a central point of a sixth object in the third image, wherein the third image is any image other than the first image in the plurality of images, the third object and the fifth object have a same attribute, and the fourth object and the sixth object have a same attribute;
placing the central point of the third object and the central point of the fifth object in a same coordinate system with a same coordinate origin, and establishing a first coordinate system based on the coordinate origin;
determining a first distance between the central point of the fourth object and the central point of the sixth object based on the first coordinate system; and
determining the fourth object as the first object when the first distance is greater than or equal to a seventh threshold.

18. The method according to claim 13, wherein the first condition further comprises at least one of the following: a photographing time of any one of the plurality of images is within a first range, or a photographing location of any one of the plurality of images is within a second range.

19. The method according to claim 13, wherein the second image is any image other than the first image in the plurality of images, and a similarity between the second image and the first image is greater than or equal to a fourth threshold.

20. A non-transitory machine-readable storage medium having instructions stored therein, which when executed by a processor, cause the processor to:
determine a plurality of images that meet a first condition, wherein the first condition comprises that a similarity between any two images in the plurality of images is greater than or equal to a first threshold;
determine, from the plurality of images, a first image that meets a second condition, wherein the first image comprises a photographed subject and a first object, and the first object is a to-be-eliminated object in the first image;
determine a second image from the plurality of images, wherein the second image comprises a second object, and a position of the second object in the second image corresponds to a position of the first object in the first image; and
cover or replace the first object with the second object, to obtain a target image, wherein the determining the first image that meets the second condition comprises:
determining a first distance between the photographed subject and a third object, wherein the third object comprises an object included in the first image other than the photographed subject; and
determining the third object as the first object when the first distance is greater than a preset threshold.

* * * * *